US008897342B2

(12) United States Patent
Zuckerman et al.

(10) Patent No.: US 8,897,342 B2
(45) Date of Patent: Nov. 25, 2014

(54) DISTRIBUTED MODEM ARCHITECTURES FOR POWER LINE COMMUNICATION SYSTEMS AND OTHER WIRED COMMUNICATION SYSTEMS

(75) Inventors: Lawrence H. Zuckerman, Livermore, CA (US); Perry I. Tsao, Sunnyvale, CA (US); Thomas Yang, Milpitas, CA (US); Keiichi McGuire, San Jose, CA (US); Chenguang Gong, Santa Clara, CA (US); Ravichander Bairi, Bangalore (IN)

(73) Assignee: National Semiconductor Corporation, Santa Clara, CA (US)

( * ) Notice: Subject to any disclaimer, the term of this patent is extended or adjusted under 35 U.S.C. 154(b) by 190 days.

(21) Appl. No.: 13/198,498

(22) Filed: Aug. 4, 2011

(65) Prior Publication Data

US 2013/0034137 A1 Feb. 7, 2013

(51) Int. Cl.
*H04B 1/38* (2006.01)
*H04L 25/02* (2006.01)

(52) U.S. Cl.
CPC ........ *H04L 25/0266* (2013.01); *H04L 25/0278* (2013.01)
USPC .......................................... 375/219; 375/256

(58) Field of Classification Search
USPC .................. 375/219–222, 256–258, 329, 331
See application file for complete search history.

(56) References Cited

U.S. PATENT DOCUMENTS

| 5,181,198 | A  | * | 1/1993 | Lechleider | 370/286 |
|---|---|---|---|---|---|
| 5,473,635 | A  | * | 12/1995 | Chevroulet | 375/287 |
| 6,089,453 | A  | * | 7/2000 | Kayser et al. | 235/383 |
| 6,430,064 | B1 | * | 8/2002 | Tsuchimoto et al. | 363/24 |
| 7,295,626 | B2 |   | 11/2007 | Chayat | |
| 7,318,096 | B2 | * | 1/2008 | Koch et al. | 709/224 |
| 7,391,317 | B2 | * | 6/2008 | Abraham et al. | 375/260 |
| 7,760,073 | B2 |   | 7/2010 | Scott et al. | |
| 7,917,120 | B1 | * | 3/2011 | Gilbert | 455/333 |
| 2006/0023734 | A1 | * | 2/2006 | Yanagida et al. | 370/438 |
| 2010/0003933 | A1 | * | 1/2010 | Sato et al. | 455/108 |
| 2010/0070141 | A1 | * | 3/2010 | Tanaka et al. | 701/45 |
| 2010/0120368 | A1 |   | 5/2010 | Smith | |
| 2011/0156640 | A1 | * | 6/2011 | Moshfeghi | 320/108 |
| 2012/0057508 | A1 | * | 3/2012 | Moshfeghi | 370/277 |
| 2012/0105230 | A1 | * | 5/2012 | Bockstoce et al. | 340/568.2 |

OTHER PUBLICATIONS

Moray Rumney, "3GPP LTE: Introducing Single-Carrier FDMA", Agilent Technologies, Agilent Measurement Journal, Jan. 1, 2008, 10 pages.
"Single-carrier FDMA", www.wikipedia.org, Mar. 18, 2011, 3 pages.
"Orthogonal frequency-division multiplexing", www.wikipedia.org, Jun. 18, 2011, 15 pages.

* cited by examiner

*Primary Examiner* — Emmanuel Bayard
(74) *Attorney, Agent, or Firm* — Andrew Viger; Frederick J. Telecky, Jr.

(57) ABSTRACT

A master modem is configured to generate a carrier signal for transmission over a wired connection. A slave modem is configured to change an impedance of the wired connection to alter generation of the carrier signal by the master modem. The impedance of the wired connection is changed based on data to be provided by the slave modem. The master modem can demodulate its own carrier signal to obtain the data provided by the slave modem. The impedance of the wired connection could be changed by changing an impedance of a transformer winding or inductor of the slave modem, where the transformer winding or inductor is coupled to the wired connection. The impedance of the wired connection could also be changed by changing a reactance of a circuit coupled to the wired connection.

17 Claims, 23 Drawing Sheets

| FIG. 19A | FIG. 19C |
| FIG. 19B | FIG. 19D |

DISTRIBUTED MODEM ARCHITECTURES FOR POWER LINE COMMUNICATION SYSTEMS AND OTHER WIRED COMMUNICATION SYSTEMS

TECHNICAL FIELD

This disclosure relates generally to wired communication systems. More specifically, this disclosure relates to distributed modem architectures for power line communication systems and other wired communication systems.

BACKGROUND

"Power Line Communication" refers to communications that occur over power distribution lines, including alternating current (AC) and direct current (DC) lines. Power Line Communication has been a controversial topic since its inception. It has been established, for example, that Power Line Communication can often be unreliable and can cause interference.

In a photovoltaic (PV) system, photovoltaic panels (solar panels) are used to convert sunlight into electrical energy. In many photovoltaic systems, large arrays of photovoltaic panels are used to generate electrical energy. For example, an array could include a number of photovoltaic panels coupled in series to form a string, and multiple strings can be coupled in parallel. Using Power Line Communication in a photovoltaic system can be problematic since typical Power Line Communication schemes are too expensive, too unreliable, or both. Other wired communication schemes can suffer similar problems.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
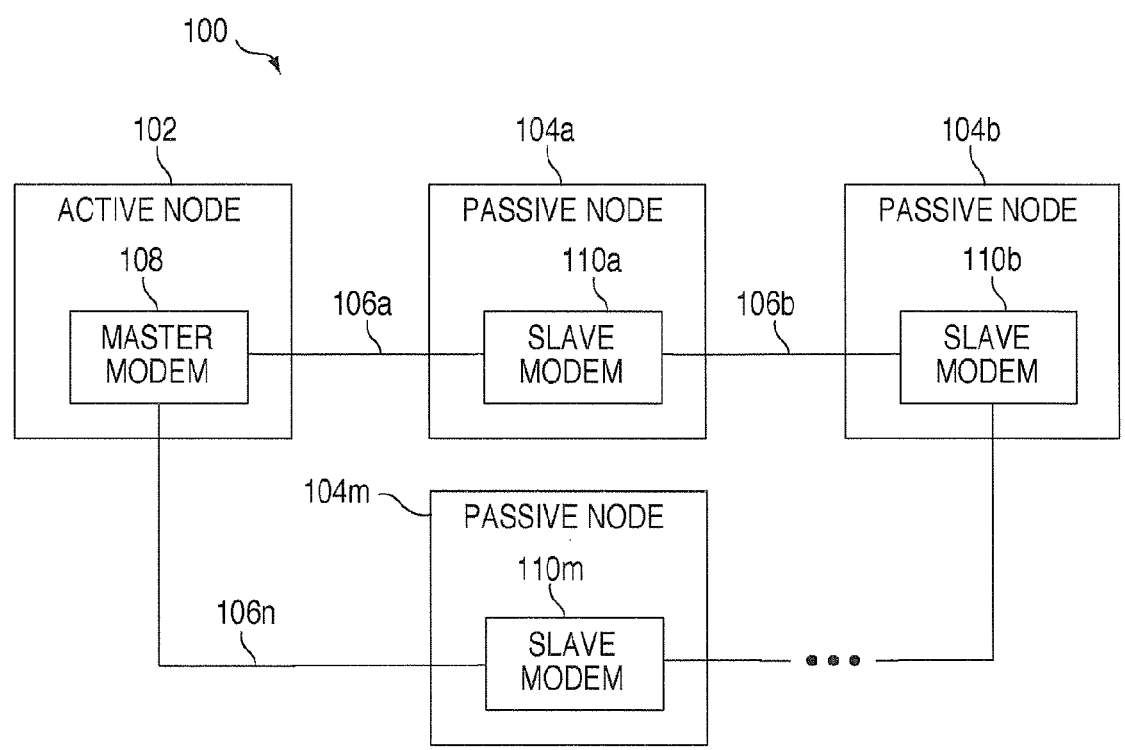
FIG. 1 illustrates an example system using a distributed modem architecture for wired communications according to this disclosure.

FIGS. 1 through 20, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, Power Line Communication can often be unreliable and cause interference. Moreover, it is often desirable to reduce or minimize the expense of transmitters and receivers used to communicate over wired connections, particularly when a large number of devices need to communicate over the connections.

In accordance with this disclosure, distributed modem architectures are provided that allow multiple devices to communicate over power lines or other wired connections. However, instead of having a separate modem generate a carrier signal at every node communicating over a wired connection, a carrier signal is generated by a modem at a single node or by modems at a relatively small number of nodes (called "active nodes"). Each node that does not generate a carrier signal (called a "passive node") contains a receiver (such as demodulator circuitry) and a modulator (such as a frequency, phase, and/or amplitude modulator). The modulator in a passive node can modulate the carrier signal generated by an active node, such as by altering the impedance of the wired connection, to transfer information to other nodes on the wired connection. If multiple active nodes are used, various techniques (such as frequency or time division multiplexing) can be used. When frequency division multiplexing is used, the harmonics can be filtered or channel frequencies that are not harmonically related can be selected.

Various embodiments of distributed modem architectures can use various implementations of the active and passive nodes. For example, an active node could modulate a carrier signal using the same technique as the passive nodes (such as by changing the line impedance) or using a different technique (such as direct modulation of the carrier signal). Also, any suitable modulation technique(s) could be used by the nodes. Examples include frequency shift keying (FSK), phase shift keying (PSK), binary FSK (BFSK), binary PSK (BPSK), differential PSK (DPSK), quadrature PSK (QPSK), minimum shift keying (MSK), and amplitude shift keying (ASK). Further, there may be a single active node (called a "master node") or multiple active nodes, and an active node may or may not include a receiver. In particular embodiments, the source of a carrier signal may be located only in a single master node.

Additional details regarding various distributed modem architectures are provided below. Note that while often described as being used in photovoltaic (PV) systems, these distributed modem architectures could be used in any system where devices communicate over one or more wired connections. The wired connection(s) may or may not represent power lines.

FIG. 1 illustrates an example system 100 using a distributed modem architecture for wired communications according to this disclosure. As shown in FIG. 1, the system 100 includes multiple nodes that communicate over a wired connection. The nodes include at least one active node 102 and one or more passive nodes 104a-104m. The wired connection is formed by multiple segments 106a-106n that couple the nodes 102, 104a-104m.

The nodes 102, 104a-104m represent any suitable structures that communicate over a wired connection. For example, the nodes 104a-104m could represent photovoltaic panels in one or more strings of panels, and the node 102 could represent a string manager or power combiner. The wired connection represents any suitable structure that transports signals over physical wiring, such as a DC or AC power line.

As described above, the active node 102 includes or is coupled to a master modem 108, and the passive nodes 104a-104m include or are coupled to slave modems 110a-110m. The master modem 108 generates a carrier signal, and optionally the master modem 108 can modulate data onto the carrier signal. The slave modems 110a-110m modulate data onto the carrier signal generated by the master modem 108, such as by modulating the impedance of one or more segments 106a-106n of the wired connection.

The master modem 108 includes any suitable structure for generating a carrier signal. Each slave modem 110a-110m includes any suitable structure for modulating data onto an externally-generated carrier signal. In particular embodiments, the master modem 108 includes a VCO and a modulator for applying modulation to the VCO. The master modem 108 may also include a receiver to detect the modulation of the carrier signal by the slave modems 110a-110m and to demodulate data from the slave modems 110a-110m. In particular embodiments, each slave modem 110a-110m includes a receiver and a modulator.

The use of passive nodes 104a-104m can help to save component and assembly costs and reduce energy consumption, thereby providing significant cost savings. Moreover, this approach can provide more reliable power line communications than in a standard system of modems. In addition, transformers used to isolate different devices (such as the passive nodes 104a-104m) from the wired connection can be smaller since the windings connected to electronics in the slave modems 110a-110m may be used only to receive modulated carrier signals and modulate the carrier coming from an active node (rather than also transmit self-generated high-power modulated carrier signals).

Although FIG. 1 illustrates one example of a system 100 using a distributed modem architecture for wired communications, various changes may be made to FIG. 1. For example, the system 100 could include any number of active nodes, passive nodes, connection segments, master modems, and slave modems. Also, the functional division shown in FIG. 1 is for illustration only. Various components in FIG. 1 could be combined, further subdivided, or omitted and additional components could be added according to particular needs. For instance, one or more of the modems 108, 110a-110m could reside outside of and be coupled to their associated nodes.

FIGS. 2 through 17 illustrate specific examples of distributed modem architectures for wired communications according to this disclosure. In particular, FIGS. 2 through 17 illustrate different ways in which master and slave modems can be implemented and used in distributed modem architectures. Note, however, that other embodiments of the master and slave modems and the distributed modem architectures could be used.

Figure 2:
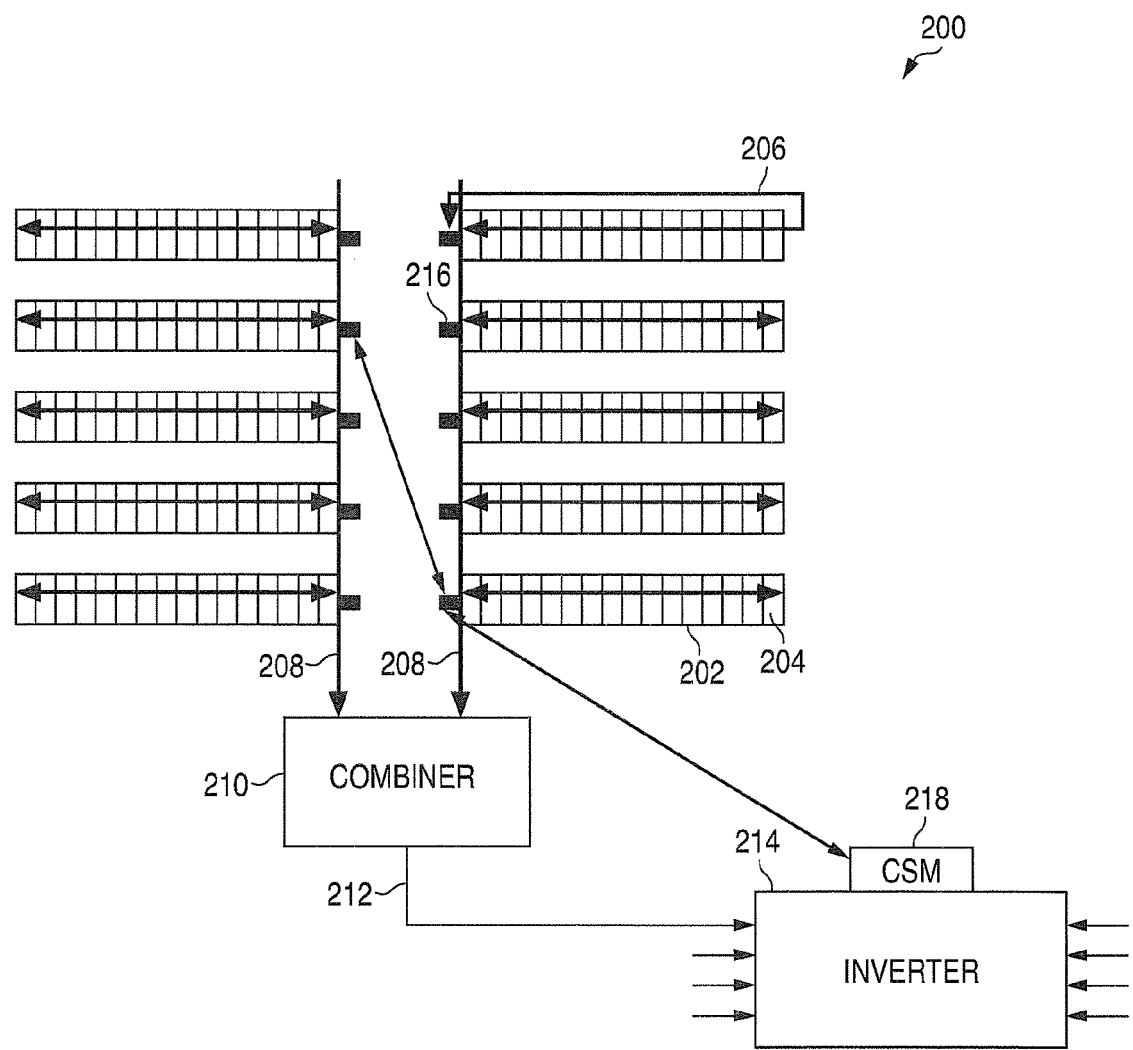
FIGS. 2 through 17 illustrate specific examples of distributed modem architectures for wired communications according to this disclosure.

FIG. 2 illustrates an example photovoltaic system 200 using a distributed modem architecture for wired communications. As shown in FIG. 2, the system 200 includes multiple strings 202 of photovoltaic panels 204, where each string 202 includes a string wiring loop 206. Sets of strings 202 are coupled via conduits 208 to a power combiner 210. Each conduit 208 could, for example, include ten pairs of "home run" wires coupling ten string wiring loops 206 to the combiner 210 (where each string wiring loop 206 is coupled at each end by a pair of wires to the combiner 210). By connecting the strings in parallel, the combiner 210 combines power harvested by the strings 202 and provides the combined power over wiring 212 to an inverter 214. The inverter 214 can convert DC power from the combiner 210 into AC power suitable for a distribution grid or other destination. The wiring 212 could represent a single pair of wires carrying 64 kW of power (512V at 125 A), and the inverter 214 could represent a 500 kW inverter coupled to eight combiners 210.

In this example, each string 202 is associated with a master modem 216, which can communicate with slave modems associated with the panels 204 in that string 202. Also, the master modems 216 can communicate and interact with a central service manager (CSM) 218. For instance, the slave modems of the panels 204 can communicate information about the panels 204 (such as DC voltage levels, DC currents, and temperatures) to the CSM 218 via the master modems 216. The CSM 218 could use the information in any suitable manner, such as to perform centralized maximum power point tracking, monitor performance, monitor temperature, perform surveillance, or detect the presence of arcing. Note that a master modem 216 can communicate with the CSM 218 or other device or system in a wired or wireless manner, such as by using a 2.4 GHz or other wireless mesh network.

Figure 3:
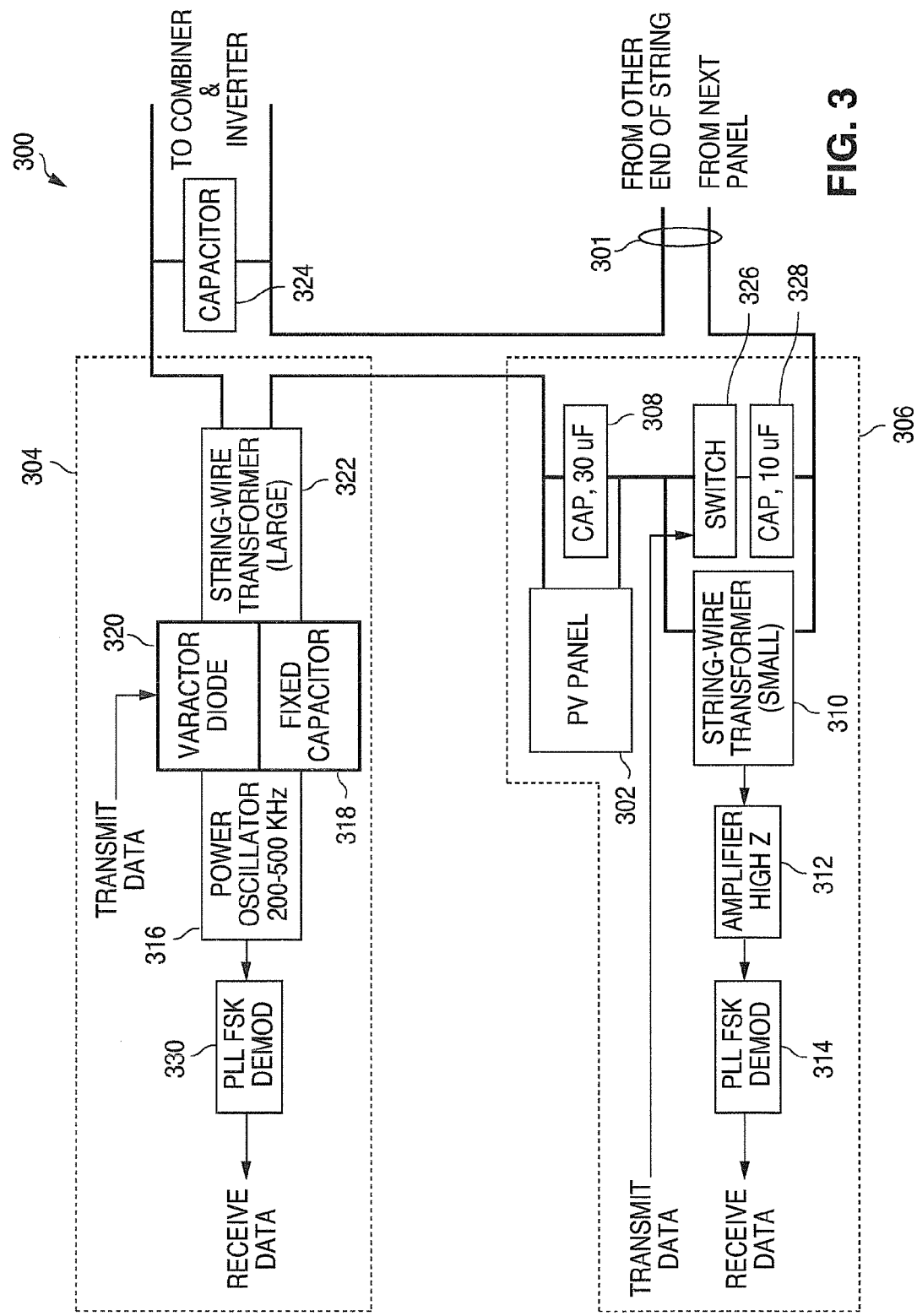

FIGS. 3 through 6 illustrate example ways in which master and slave modems can be implemented in the system 200 of FIG. 2. As shown in FIG. 3, a system 300 is used in conjunction with a string of photovoltaic panels 302 (such as a string that includes up to 24 panels). The system 300 includes a master modem 304 for a string manager and a slave modem 306 for each panel 302. The slave modem 306 could, for example, reside within a junction box of its associated panel 302. The string manager services the entire string of panels 302, such as by acting as a master communication node. The panels 302 generate voltages that add up in series to present a high voltage to an inverter, which converts DC power into AC power. A typical panel 302 might deliver 32V at 10 A when the sun is shining, so a string of 24 panels would deliver 768V at 10 A (7.68 kW of power).

Each panel 302 may or may not include a DC power optimizer, such as a SOLARMAGIC unit from NATIONAL SEMICONDUCTOR CORPORATION. Also, a capacitor 308 (such as a 30 µF capacitor) could be coupled across each panel's output. For communication purposes, together with each panel 302 (perhaps within its junction box) is an electronic communications assembly that includes a transformer 310. The transformer winding that carries the string current can have a very low resistance (such as 20 mΩ) in order to dissipate as little of the harvested DC power as possible.

In this example, the slave modem 306 is able to both receive incoming data and transmit outgoing data. When receiving incoming data, a signal is received through the transformer 310. The signal could represent any suitable signal, such as a signal having a carrier with a frequency between 90 kHz and 500 kHz that moves back and forth by 3 kHz to 10 kHz to represent as symbols the Mark and Space of digital data. An amplifier 312, such as a high-gain amplifier, amplifies a voltage across the transformer 310. The amplified signal is provided to a demodulator 314, which can follow the carrier around in frequency and demodulate the incoming data. The demodulator 314 could, for example, represent a phase locked loop (PLL) based FSK demodulator. The demodulator 314 outputs the received incoming data, which can be used in any suitable manner.

The master modem 304 in this example includes an oscillator 316, such as a 90 kHz to 500 kHz power oscillator. The oscillator 316 delivers a large circulating current into a tank circuit. The capacitors of the tank circuit are shown as a fixed capacitor 318 and a variable capacitor 320, which could be implemented using a varactor diode. The capacitors 318-320 are coupled to the string wiring loop 301 through a transformer 322. The capacitor 320 receives binary digital data to be transmitted, and the capacitor 320 converts the data into frequency shift keying for the oscillator 316. However, note that the frequency shift keying could be implemented in other ways, such as by switching the fixed capacitor 318 into and out of the circuit. If the carrier signal on the wiring loop 301 is very strong, it may cover at least a substantial portion of any noise that might exist (such as noise from an inverter). In this way, data from the master modem 304 can be reliably transferred to multiple slave modems 306.

The other portion of the tank circuit described above (an inductor) is not shown in FIG. 3 because it could be formed by the string wiring loop 301. For a maximum loop length of 24 transformers 310 and associated wiring, the total inductance could be 100 µH to 140 µH. The loop is completed by the capacitors 308 that short circuit the panels' electrical circuitry for the carrier frequency, as does a capacitor 324 coupled across the string wiring loop 301 (which makes the circuitry of any inverter substantially irrelevant to the carrier frequency). The wiring loop's inductance can also provide a Q factor of several hundred, making it possible to use an excellent quality oscillator 316. In particular embodiments, if the total capacitance of the oscillator 316 is about 2,000 pF and the oscillator 316 is properly coupled to the wiring loop inductance through the transformer 322, the oscillator 316 may oscillate at several hundred kilo-Hertz.

The string wiring loop winding of each transformer 310 could have a self inductance of about 3 µH or other value large enough to permit the transformer 310 to function while permitting a practical component with small enough DC or low frequency resistance to minimize power loss in photovoltaic installations. If the inductance of any one of these transformer windings vanishes, the total string inductance decreases, causing the frequency of the oscillator 316 to increase by a few percent. In the slave modems 306, binary digital data values in transmit data can be used to turn a switch 326 on and off at a desired data rate. The switch 326 is located in series with a capacitor 328 (such as a 10 µF capacitor), both of which are coupled across the string wiring loop winding of the transformer 310. Operating the switch 326 alternately causes the winding inductance of the transformer 310 to vanish and return. The capacitor 308 is placed in series with the switch 326 so that the switch 326 does not need to carry the string current, which may be 10 A or more.

In this way, data from the slave modem 306 can be sent to the master modem 304 using the master modem's own oscillator 316. In particular, the changes in the wiring loop's impedance can change the frequency of the oscillator 316, whose output is coupled to a demodulator 330. The demodulator 330, such as an FSK demodulator, demodulates the oscillator's output to generate the incoming receive data (which can be used in any suitable manner). The data is also sent simultaneously to the other slave modems 306 on the wiring loop 301. The master modem 304 could remain operational at all times so that a carrier signal is constantly generated for use by the slave modems. For systems where the slave modems send only after polling by the master modem, the carrier signal could remain on at all times or be turned off during periods when no packets are being sent.

It is also possible to use the wiring loop 301 and the transformers 310, 322 to send power to the slave modems 306, which may be useful at various times (such as at night when there is no power generated by the panels 302). The power can be used to keep the communications circuitry and optionally other components (such as surveillance circuitry) operational.

Each master modem 304 here has relatively few components and can use little to almost no power during operation. The transformers 310 can be smaller and less costly than the transformer 322 since the transformers 310 may need to deliver almost no power. Nevertheless, data transfer is more reliable because the master modem 304 is decoding slave modems' data using its own carrier signal. Because of this, simple and inexpensive modulation (such as binary and non-coherent FSK) can be used.

Note that the use of the switch 326 with the capacitor 328 is but one example of the various ways in which the impedance of the wiring loop 301 can be modified. For example, the capacitor 328 could be omitted, and the switch 326 could be coupled in series with the capacitor 308 across the output of the panel 302.

As a second example, the binary transmit data could cause enough current to flow in the winding of the transformer 310 to saturate the transformer core for one of the binary values, thereby causing the inductance of the winding to vanish for that binary value. The transformer 310 can be designed so that the core is not saturated at high current (such as 13 A DC). Because of this, the inductance of the wiring loop winding is maintained with this large amount of current. If the core is saturated at the data rate, the inductance disappears without the need for the switch 326. An inductor core saturates if there is a large enough flux density, which can occur with a large current though a few turns or a much smaller current through many turns. As this transformer 310 is used for receiving a carrier signal and not transmitting one, it may operate better if the transformer winding that faces the receiver has many turns of fine wire. In receive mode, this winding sees only the AC component of an incoming signal. In transmit mode, the winding can be keyed at the data rate with the necessary current to saturate the core (such as 10 mA). Even if its resistance is 500Ω, it may take only 5V to produce 10 mA. A relatively simple calculation shows the number of turns needed to saturate the core with this amount of current, how much inductance would result, and whether the inductive time constant would permit a 500 Hz square wave current (for a 1 kbps data rate) or other suitable signal to exist.

As a third example, instead of saturating the transformer core with a current, the binary transmit data could cause the electronics-side winding of the transformer 310 to be shorted out. This would then reflect a zero impedance on the wiring loop winding, causing its inductance to vanish.

As a fourth example, the capacitor 328 in series with the switch 326 could have a capacitance (such as much smaller than 10 µF) that causes a parallel-tuned circuit to be formed in conjunction with the transformer winding. If its resonance frequency is set to be well below the frequency of the oscillator 316, a capacitive reactance is created in series with the wiring loop instead of a zero reactance. Thus, the Space/Mark frequency shift can be increased above a few kilo-Hertz, such as to 10 kHz. This can further increase transmission reliability. At the same time, the signal current within the wiring loop 301 can decrease, providing an additional handle on bit value if needed. If the value of the capacitor 328 is set to place the parallel-tuned circuit's resonance point well above that of the oscillator's frequency, an inductive reactance is created in series with the wiring loop. That is, a larger inductive reactance than that caused by the transformer winding alone is created. This shifts the oscillator's frequency down for one of the bit values.

As a fifth example, modification of the string wiring loop's impedance could also be achieved from the electronics-side of the transformer 310. For instance, it is possible to leave the transformer winding un-terminated (or terminated with only with the amplifier 312) when in receive mode. A capacitor could be switched in during the transmit period to create a parallel resonance above the frequency of the oscillator 316 for one of the bit values. For another of the bit values, an additional capacitor can be switched in parallel to move the resonance frequency to below that of the oscillator's frequency. In so doing, the Mark and Space frequencies can be above and below the carrier frequency, thus maintaining the carrier frequency at its no-modulation value. This would allow these resonance frequencies to be much further from the carrier frequency and still allow the same peak-to-peak frequency shift over a wider carrier frequency range.

The ability to do this becomes very important as the string wiring loop 301 becomes longer with more panels 302. Assume there are 24 panels 302, and the minimum string wiring loop length is 220 feet with an inductance of about 86 µH. Added to this is the combined inductance of the transformers 310, 322, which could be about 75 µH. The total inductance is therefore 161 µH, which is changed to 158 µH by the Mark symbol of any one slave modem 306 as it removes the inductance of its transformer 310. This is about a 2% change of inductance and inductive reactance, which may cause a 1% frequency change of the master oscillator's frequency. At 250 kHz, this is a frequency shift of 2.5 kHz. At this frequency, the reactance is 253Ω, and the parallel capacitance inside the master modem 304 plus strays could be 2,517 pF, which is very practical.

Figure 4:
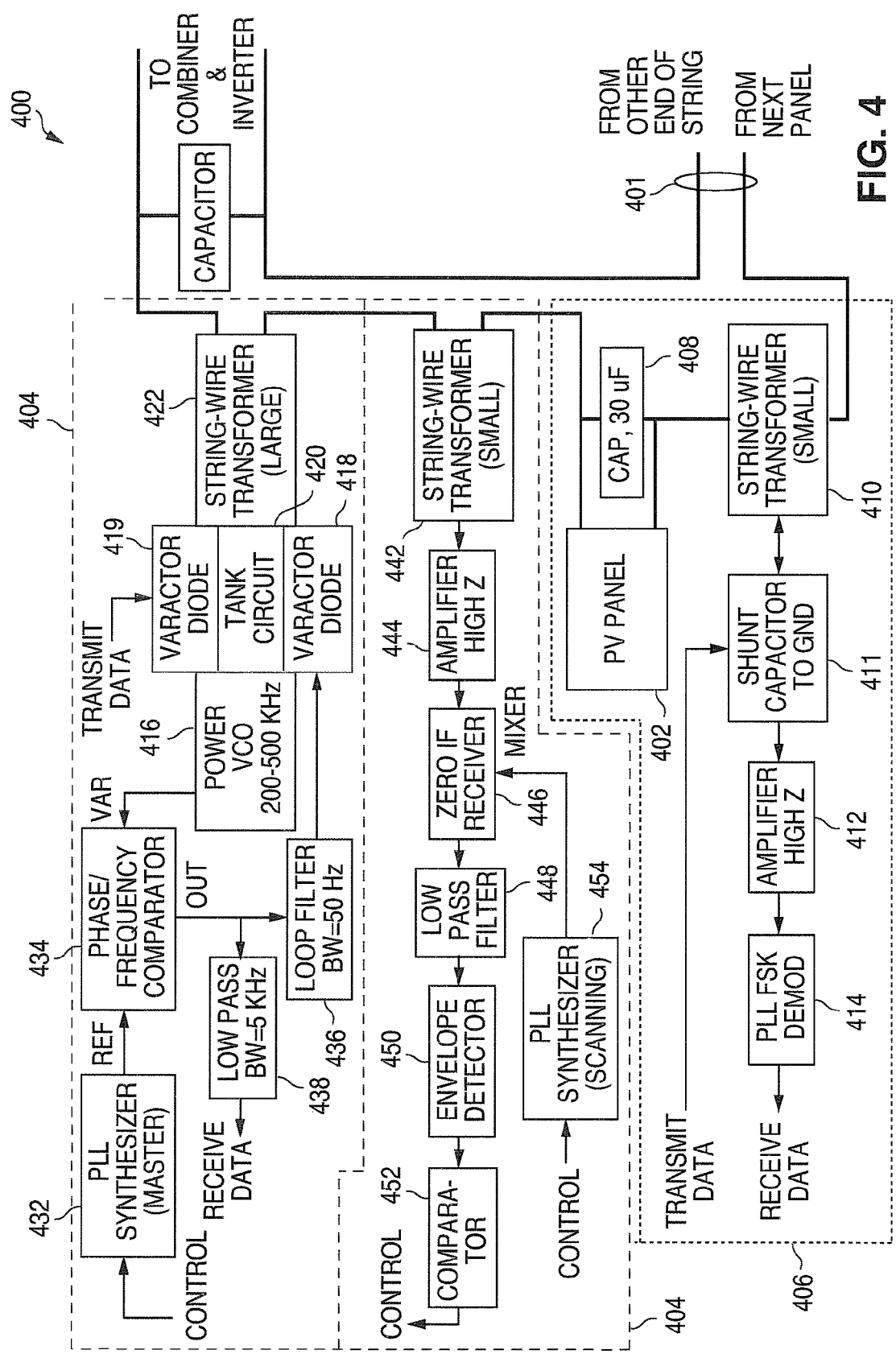

As shown in FIG. 4, a system 400 is used in conjunction with a string of photovoltaic panels 402 and includes a master modem 404 and a slave modem 406 for each panel 402. In this example, a capacitor 408 is coupled across the output of the panel 402 and in series with a transformer 410. The slave modem 406 includes an amplifier 412 and a demodulator 414. These components may be the same as or similar to corresponding components in FIG. 3.

In FIG. 4, the slave modem 406 also includes a shunt to ground capacitor 411 coupled between the transformer 410 and the amplifier 412. The capacitor 411 is disconnected for one bit value in transmit data and is coupled in parallel with the transformer winding for the other bit value in transmit data. Via transformer coupling, positive and negative reactance values can be created in the wiring loop 401. Note, however, that the capacitor 411 could be replaced by other components, such as a shunt resistor to ground that is shorted during Mark symbols or a transmit/receive switch controlled by the transmit data.

In this example, the master modem 404 includes an oscillator 416 that is coupled to a transformer 422 via two variable capacitors 418-419 and a tank circuit 420. The oscillator 416 can be free running and can act as a pilot that other components in the system 400 follow. The oscillator 416 can be embedded with a PLL or other structure so that its operating frequency can be controlled. The PLL in FIG. 4 is formed by a PLL synthesizer 432, a phase/frequency comparator 434, and a loop filter 436 (such as filters with a 50 Hz bandwidth). These components operate to adjust the variable capacitor 418 so that the oscillator 416 achieves a desired frequency. A filter 438 (such as a low-pass filter with a 5 kHz bandwidth) detects modulated data within the output of the oscillator 416 caused by the slave modems 406 and demodulates the data to generate receive data.

In this embodiment, a control loop is a slow loop with a bandwidth of about 50 Hz. The carrier frequency can be set to a suitable and known value by setting the reference frequency of the phase/frequency comparator 434. Transmit data can be fed into the master modem 404, such as by providing the transmit data to the variable capacitor 419 as a voltage as shown in FIG. 4 or by switching in a separate capacitor. For a similar result as the slave modems 406, there can be one parallel capacitor that is disconnected during the transmit period to move the frequency off center and a second capacitor of twice that value that is switched in to key the transmit data. The data speed is rapid enough so that the slower PLL cannot suppress it.

The receive data in the master modem 404 comes from the phase/frequency detector (PFD) 434 through the filter 438, which does not smear out the data but removes the high-frequency PFD switching components. Note, however, that the filter 438 could be omitted, and the receive data could be received through the loop filter 436. Also note that if the output of the phase/frequency detector 434 is not suitable, the receive data can come from a PLL-type FSK demodulator as is done in FIG. 3.

FIG. 4 also shows an optional receiver 440 in the master modem 404. The receiver 440 is operable to (i) tune the band while the main oscillator 416 is running the system and (ii) look for the quietest frequency. Once the quietest frequency is found, the main oscillator 416 can be commanded to use that frequency. The receiver 440 here includes a transformer 442 for receiving a signal over the wiring loop 401. A high-gain amplifier 444 amplifies the signal, and a zero intermediate frequency (IF) receiver 446 down-converts the signal to baseband. A filter 448 (such as a low-pass filter) filters the baseband signal, and an envelope detector 450 identifies the envelope of the filtered signal. A comparator 452 compares the envelope (such as to a threshold or reference value), and a PLL synthesizer 454 controls the scanning so that the quietest frequency can be identified.

Figure 5:
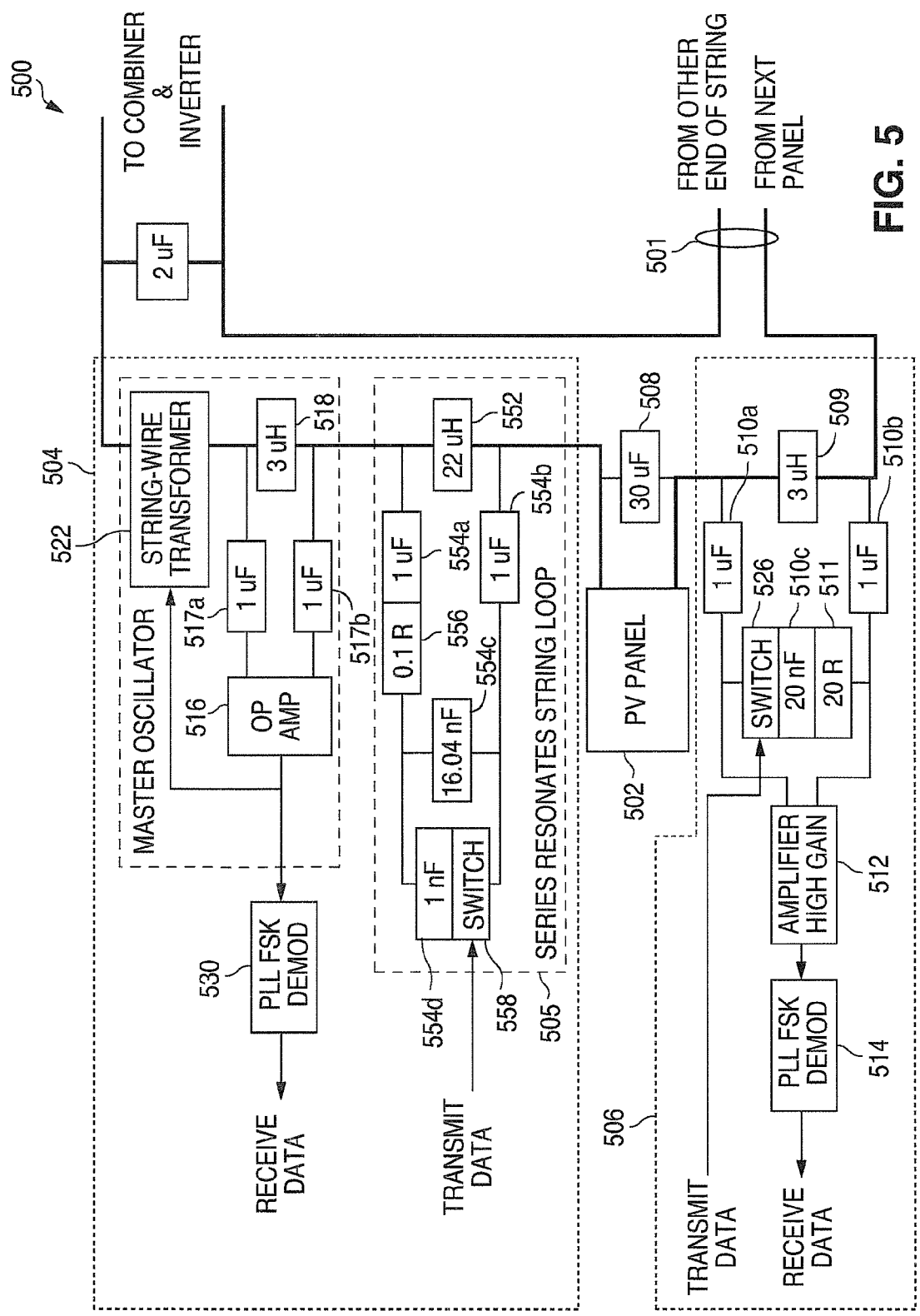

As shown in FIG. 5, a system 500 is used in conjunction with a string of photovoltaic panels 502 and includes a master modem 504 and a slave modem 506 for each panel 502. A capacitor 508 is coupled across the output of the panel 502, and the slave modem 506 includes an amplifier 512 and a demodulator 514. The slave modem 506 also includes an inductor 509 (such as a 3 µH inductor), which takes the place of a transformer. Capacitors 510a-510b (such as 1 µF capacitors) couple the inductor 509 to the amplifier 512. A capacitor 510c (such as a 20 nF capacitor), a resistor 511 (such as a 20Ω resistor), and a switch 526 are coupled across the inductor 509.

In the master modem 504, an operational amplifier 516 is coupled to a transformer 522 and a demodulator 530. Capacitors 517a-517b (such as 1 µF capacitors) couple an inductor 518 (such as a 3 µH inductor) to the operational amplifier 516.

As shown in FIG. 5, the master modem 504 also includes a circuitry block 550. In the manner described above, each slave modem 506 can add or subtract reactance from the wiring loop 501 to modulate the frequency of the master modem's oscillator (formed using the components 516-518). Larger total reactance changes by percentage generate larger frequency deviations, which can increase the robustness of the modem system when competing with noise. Even if there are 24 panels 502 (each adding its own inductance and inductive reactances), most of the wiring loop's inductance and inductive reactance come from the wiring loop 501 itself. The circuitry block 550 operates to reduce the loop inductive reactance by adding in series a capacitive reactance. The capacitive reactance does not come from a series capacitor alone as the direct current being harvested by the solar array would not flow.

Here, the capacitive reactance is created using an inductor 552 (such as a 22 µH inductor), capacitors 554a-554b (such as 1 µF capacitors), a capacitor 554c (such as a 16.04 nF capacitor), a capacitor 554d (such as a 1 nF capacitor), a resistor 556 (such as a 100 mΩ resistor), and a switch 558. The capacitors 554a-554b help to block large high voltage direct current from flowing in case the inductor 552 opens. The inductor 552 and the capacitor 554c form a parallel-tuned circuit, with the inductor 552 allowing direct current to flow within the wiring loop 501.

If the capacitor 554c resonates the inductor 552 at the carrier frequency, the network presents substantially zero reactance and large resistive impedance. Thus, there would be no reduction of overall inductive reactance, and the large resistive impedance can cause a major reduction of current to flow at the carrier frequency, making it unusable as an oscillator tank circuit. However, if the capacitor 554c resonates the inductor 552 at a suitable frequency lower than the carrier frequency, its resistive impedance becomes reasonably low, and it presents a capacitive reactance across the network. This achieves the goal of reducing the wiring loop's inductive reactance.

Figure 6:
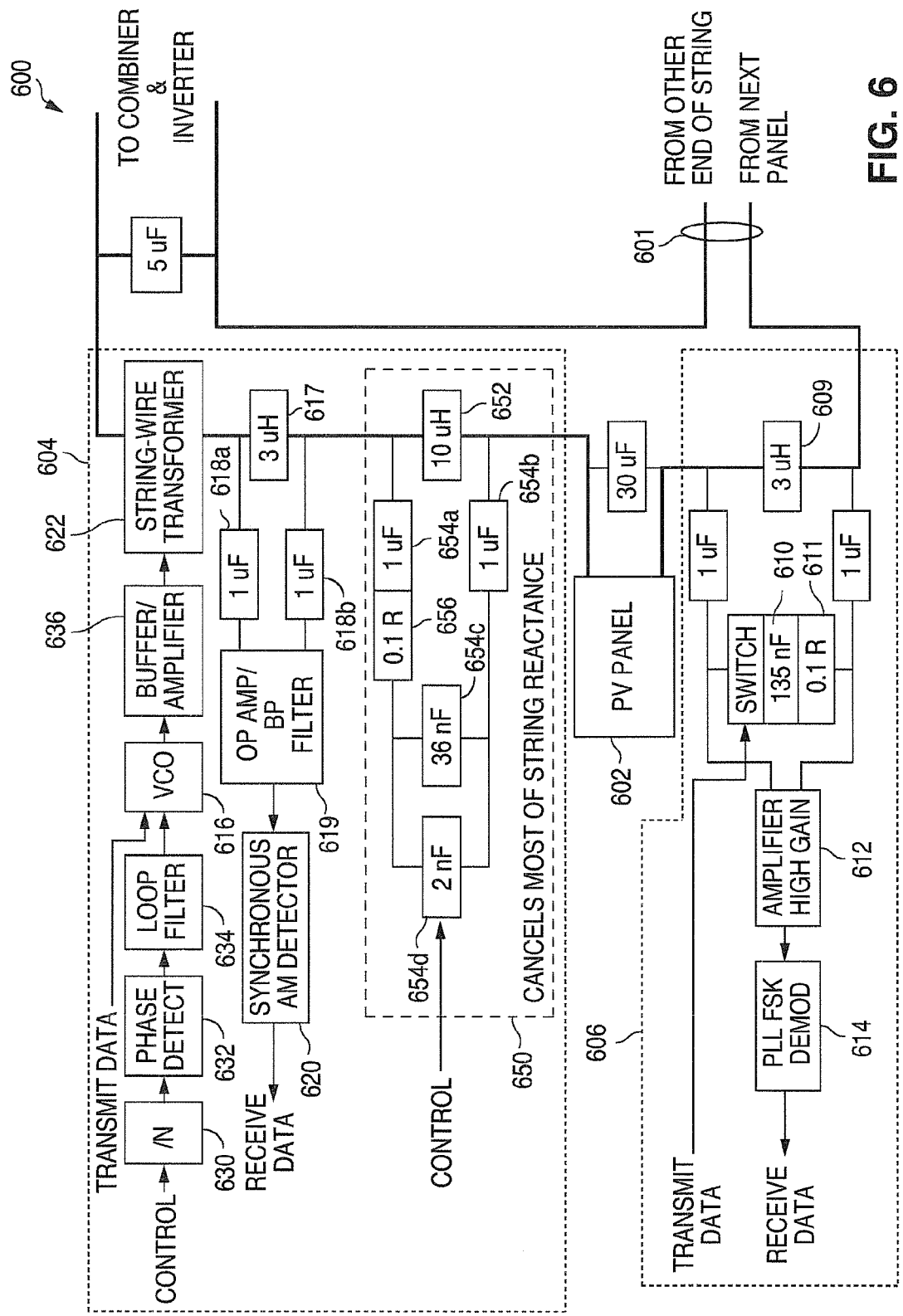

As shown in FIG. 6, a system 600 is used in conjunction with a string of photovoltaic panels 602 and includes a master modem 604 and a slave modem 606 for each panel 602. The slave modem 606 is similar to the slave modem 506 of FIG. 5. However, the capacitor 610 could represent a 135 nF capacitor, and the resistor 611 could represent the equivalent series resistance of a capacitor 654a. As before, the master modem 604 could include the bulk of the additional components and intelligence, while the slave modems 606 may require very little power and very few inexpensive components to operate.

Unlike FIG. 5, the system 600 in FIG. 6 uses amplitude modulation instead of FSK modulation for uplink data flow. Possible previous power line communication schemes induce DC string current changes as modulation and detect the same to effect information transfer. One problem with this approach is that current changes for the modem signal are a very small percentage of the total current flow in a photovoltaic system (such as a few milliamps versus 10 A).

In FIG. 6, current differences are used to distinguish between binary Marks and Spaces, but the current differences are a larger percentage of the string current. Instead of DC current, an AC carrier current is used as a carrier current to cover up noise. As with previous figures, there is an oscillator 616 at the master modem 604, and the master modem 604 can send data to the slave modems 604 via FSK or other modulation. The oscillator 616 couples its output to the wiring loop 601 with a transformer 622. The master modem 604 includes a divide by N (IN) circuit 630, a phase detector 632, and a loop filter 634 that provide input to the oscillator 616. A buffer/amplifier 636 is coupled between the oscillator 616 and the transformer 622.

The master modem 604 also has an inductor 617 (such as a 3 μH inductor) in series with the wiring loop 601 to pick off a signal from the loop 601. The inductor 617 is coupled to two capacitors 618a-618b (such as 1 μF capacitors), which are coupled to an operation amplifier and filter 619 (such as a bandpass filter). A synchronous amplitude modulation (AM) detector 620 is coupled to the operation amplifier and filter 619.

The master modem 604 could have the only transformer in the system 600, and each slave modem 606 could have only an inductor 609 in series with the wiring loop 601. The master modem 604 also includes a circuitry block 650 that includes a second series-coupled inductor 652 (such as a 10 μH inductor) coupled to the wiring loop 601, capacitors 654a-654b (such as 1 μF capacitors), a capacitor 654c (such as a 36 nF capacitor), a capacitor 654d (such as a 2 nF capacitor), and a resistor 656 (such as a 100 mΩ resistor). These components may operate in a similar manner as discussed above to cancel most of the reactance of the wiring loop 601. The real part of the impedance left over could be only a few Ohms.

Unlike previous figures, the master modem 604 here does not need to have its frequency controlled with the help of the wiring loop's inductance. Rather, it can be controlled with the resonator in its oscillator 616, which can be independent of wiring loop characteristics. In fact, the oscillator 616 could be a standard PLL synthesizer. The master modem 604 uses the inductor 617 to read the instantaneous current in the wiring loop 601 by measuring the voltage across the inductor 617 from the carrier generated by the master modem. The voltage could be measured in any suitable manner, such as with the synchronous AM detector 620 (whose properly phased LO signal could come from the oscillator 616) or with a diode envelope detector. No servo loop may be needed in FIG. 6.

The slave modems 606 operate in a similar manner as the slave modems 506 in FIG. 5. The inductor 609 and a switched-in capacitor 610 are used to transmit digital symbols. A difference amplifier 612 can be used to pick off the carrier signal from across the inductor 609 and to feed a higher amplitude version to a demodulator 614. One difference is the value of the capacitor 610. Here, its value is chosen to parallel resonate the inductor 609 at the carrier frequency to change the wiring loop's impedance from a very low amount to a very high amount. In this way, the loop current at the carrier frequency almost disappears for one of the transmitted bit values.

This architecture may be much more tolerant to different numbers of panels 602. Each slave modem 606 could have identical inductors 609 and capacitors 610, whose nominal 5% tolerance values can be chosen to resonate at the nominal master oscillator's frequency. Maintaining these tolerances may be enough to obtain adequate wiring loop current reduction for the chosen value of digital data being sent. If not, when the array of panels 602 wakes up every morning, each slave modem 606 could be commanded one at a time by the master modem 604 to switch its parallel capacitor 610 on for a few seconds while the master modem 604 increments its PLL synthesizer (oscillator 616) to find the minimum wiring loop carrier current. The master modem 604 can store each frequency and use it whenever the associated slave modem 606 is being addressed. In other embodiments, each slave modem 606 could switch in additional parallel capacitors 610 to permit its parallel resonance to match the carrier frequency.

The procedure for instructing a slave modem 606 to move to a new channel or re-match the active node carrier frequency and resonant frequency of each passive node could be as follows:

The master modem 604 commands the slave modems 606 via a broadcast-coded packet to move to some new channel.

The slave modems 606 each switch in a new capacitor 610 corresponding to that channel.

The master modem's synthesizer (oscillator 616) goes to the center frequency of that channel.

The master modem 604 adjusts an adjustable capacitance 654d to peak the wiring loop's current.

The master modem 604 commands each slave modem 606 in sequence to hold Mark (high-impedance state) for a few seconds to find the correct nearby frequency that minimizes the wiring loop's current.

The master modem 604 comes back to this correct nearby frequency for each slave modem 606 to receive its signal.

This adjustment can be made at any suitable time(s), such as at startup in the morning or at various times of the day as component temperature changes may cause drift. It can also be performed when impaired communication is detected.

It is also possible for the master modem 604, when it is receiving data from a slave modem 606, to sweep the carrier frequency once for each bit period and look for a drop in current (negative-going pulse). This technique may allow the bit value to be measured without having to either account for the exact resonance frequency of each slave modem's parallel-tuned circuit or provide an adjustment at each slave modem 606 to move its resonance frequency to that of the carrier.

The master modem's circuitry block 650 that cancels most of the wiring loop's reactance at the carrier frequency permits increased or maximum current to flow when a slave modem 606 is in the low-impedance bit value state. For a 24-panel loop, the total wiring loop's reactance (with all slave modems 606 in the low-impedance state) may be around 267Ω (virtually all inductive). If 5V is divided by this number, a wiring loop carrier current of 18.7 mA is achieved. When a slave modem 606 is sending the Mark value, its impedance magnitude (almost all real) could be about 185Ω, so the total impedance rises to 324Ω for a wiring loop current of 15.4 mA. Therefore, the Mark/Space current ratio is 0.82, representing an 18% drop.

If necessary, to combat problems with noise, the Space value current (which is also the same current the slave modem 606 sees when it is picking off an FSK-modulated carrier voltage) could be made as large as possible. The circuitry block 650 of FIG. 6 cancels most of the wiring loop's inductive reactance. Thus, it has a similar function as the architecture described in FIG. 5, but it does not need to operate as accurately because there is no need to remove all of the real part of the impedance to obtain a high Q for the wiring loop 601. High Q is not relevant here since the wiring loop 601 is no longer part of a tank circuit. In FIG. 6, the block 650 inserts a capacitive reactance and could leave only 19Ω inductive reactance and 27Ω real impedance in the loop. The result is a wiring loop current of 152 mA with all slave modems 606 in Space and 23.5 mA with any one of the slave modems 606 in Mark. Therefore, the Mark/Space ratio is 0.15 instead of 0.82, a much larger separation in "information space". With fewer panels, the circuitry block 650 may become less important.

There are various additional ways to increase reliability of the systems shown in FIGS. 3 through 6. One possibility is to switch in different capacitance values in parallel with a transformer or inductor at a slave modem so that the resonance frequency has multiple values. This can provide some robustness in case there is too much noise at one of the frequencies. The master modem could also transmit carriers at multiple frequencies simultaneously, which allows multi-channel communications. In this case, the set of frequencies could be chosen so that no frequency appears on harmonics of the other frequencies. This makes it possible to use carrier signals that are less well filtered. It is also possible for the system to use a frequency hopping sequence. Conventional frequency hopping provides for successive blocks of data to be sent as the frequency hops to new values. In this case, the same data could be sent at each of the hop channels, and the next block of data could be sent when the system returns to the original channel.

As noted above, in FIGS. 2 through 6, a master modem forms a part of or is used in conjunction with a string manager that manages operation of a string of photovoltaic panels. However, one or more master modems could be used in other or additional location(s) within a photovoltaic system. For example, a single master modem could be used in a combiner box. This can help to reduce costs by reducing the number of master modems and associated housings and other components in a system.

Figure 7A:
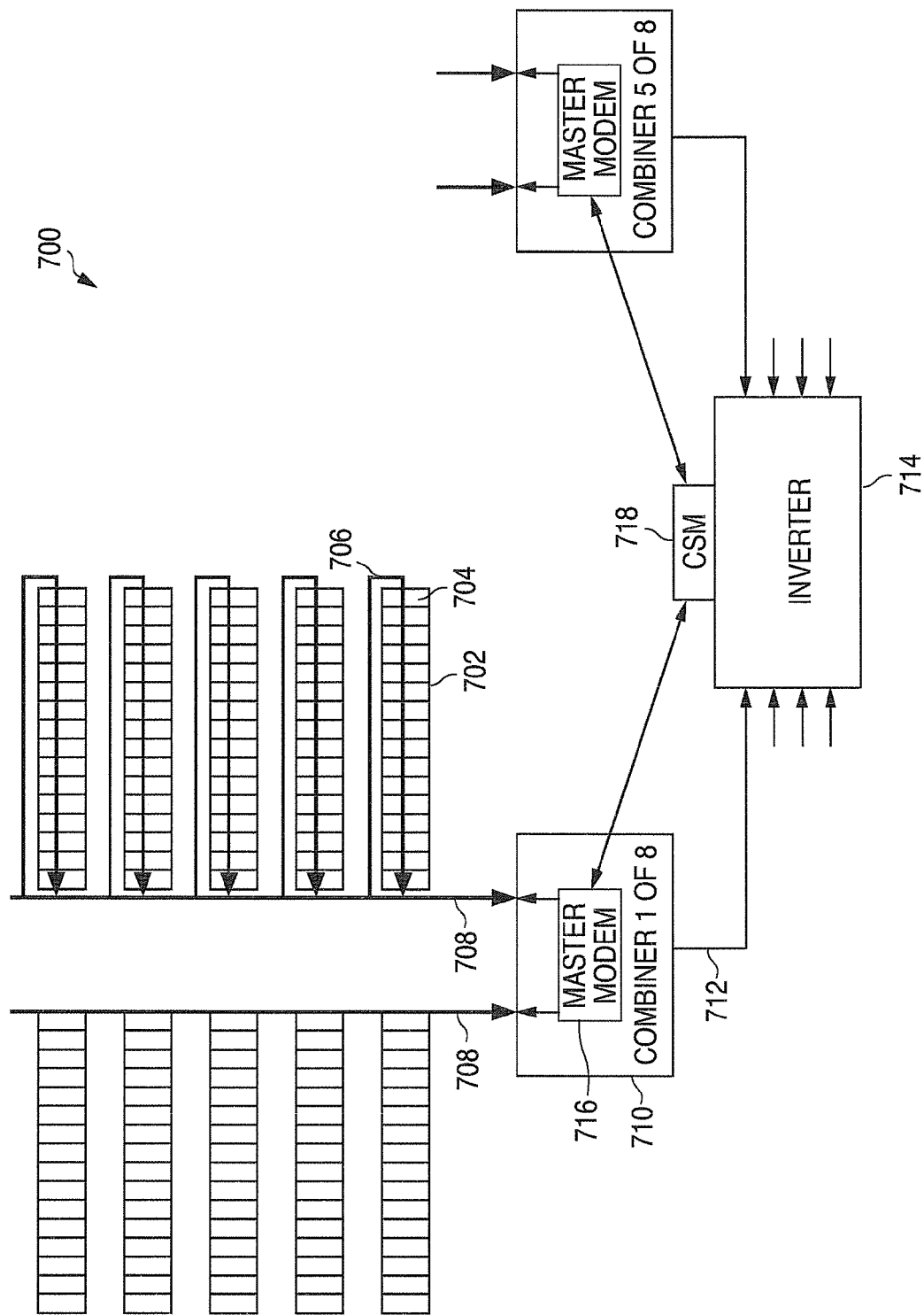
Figure 7B:
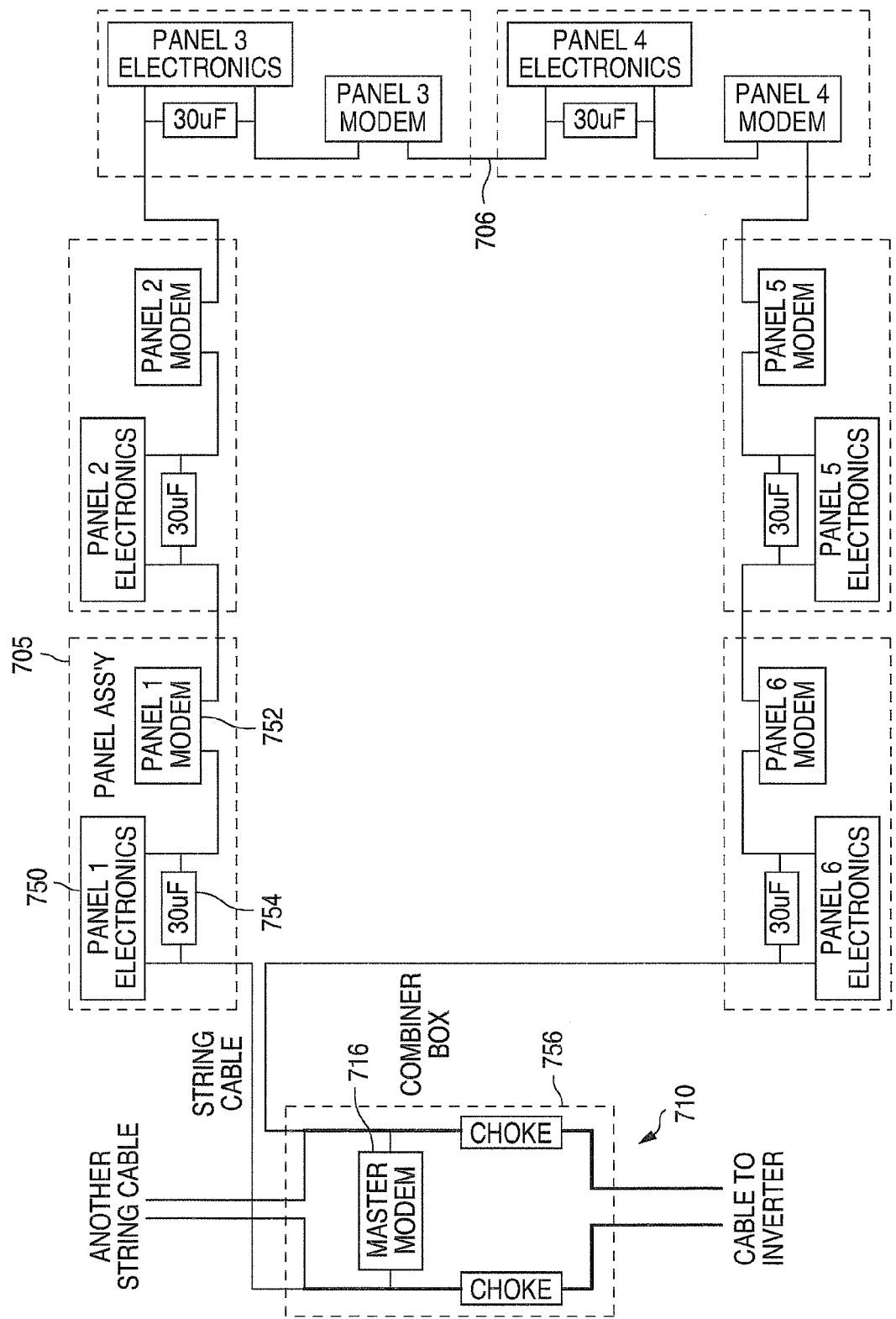

FIGS. 7A and 7B illustrate another example photovoltaic system 700 using a distributed modem architecture for wired communications. As shown in FIG. 7A, the system 700 includes multiple strings 702 of photovoltaic panels 704, where each string 702 includes a string wiring loop 706. The string wiring loops 706 are coupled via conduits 708 to combiners 710, which are coupled via wiring 712 to an inverter 714. Each combiner 710 includes or is otherwise associated with a master modem 716, which can communicate with slave modems associated with the panels 704 in multiple strings 702. The master modems 716 also communicate and interact with a CSM 718, such as via wired or wireless communications. Note that a master modem 716 can communicate with slave modems in more than one string without the need for expensive switching or filtering hardware.

As shown in FIG. 7B, each panel 704 has an associated panel assembly 705, which could include the panel 704 and related components. In this example, each panel assembly 705 includes panel electronics 750, such as circuitry for temperature and power measurements, surveillance, data storage, power conversion (like a DC-DC converter), and power optimization. A panel (slave) modem 752 communicates with the master modem 716 over the string wiring loop 706. The panel electronics 750 and slave modem 752 could reside on a common circuit board. A capacitor 754 (such as a 30 μF capacitor) is coupled across the panel electronics 750. Note that any number of panels 704 could be used here, such as up to 24 panels. In the combiner 710, two chokes 756 can be used to prevent the master modem from seeing a low impedance (high carrier current) even when one of the passive nodes in one of its strings is in the high impedance state.

Note that the wiring for multiple strings could run in the same conduits. Also, the master modem 716 could be powered at night using power from the AC mains. In addition, the carrier current from the master modem 716 can be used to power the panel electronics 750 during the day or night, which may eliminate the need for a DC-DC converter at each panel assembly 704.

In FIGS. 7A and 7B, the master modem 716 is shown as residing in the combiner 710. However, one or more master modems could be used in any other suitable location(s) within a photovoltaic system. For example, in smaller systems without a combiner, a master modem could be located within the inverter.

Figure 8:
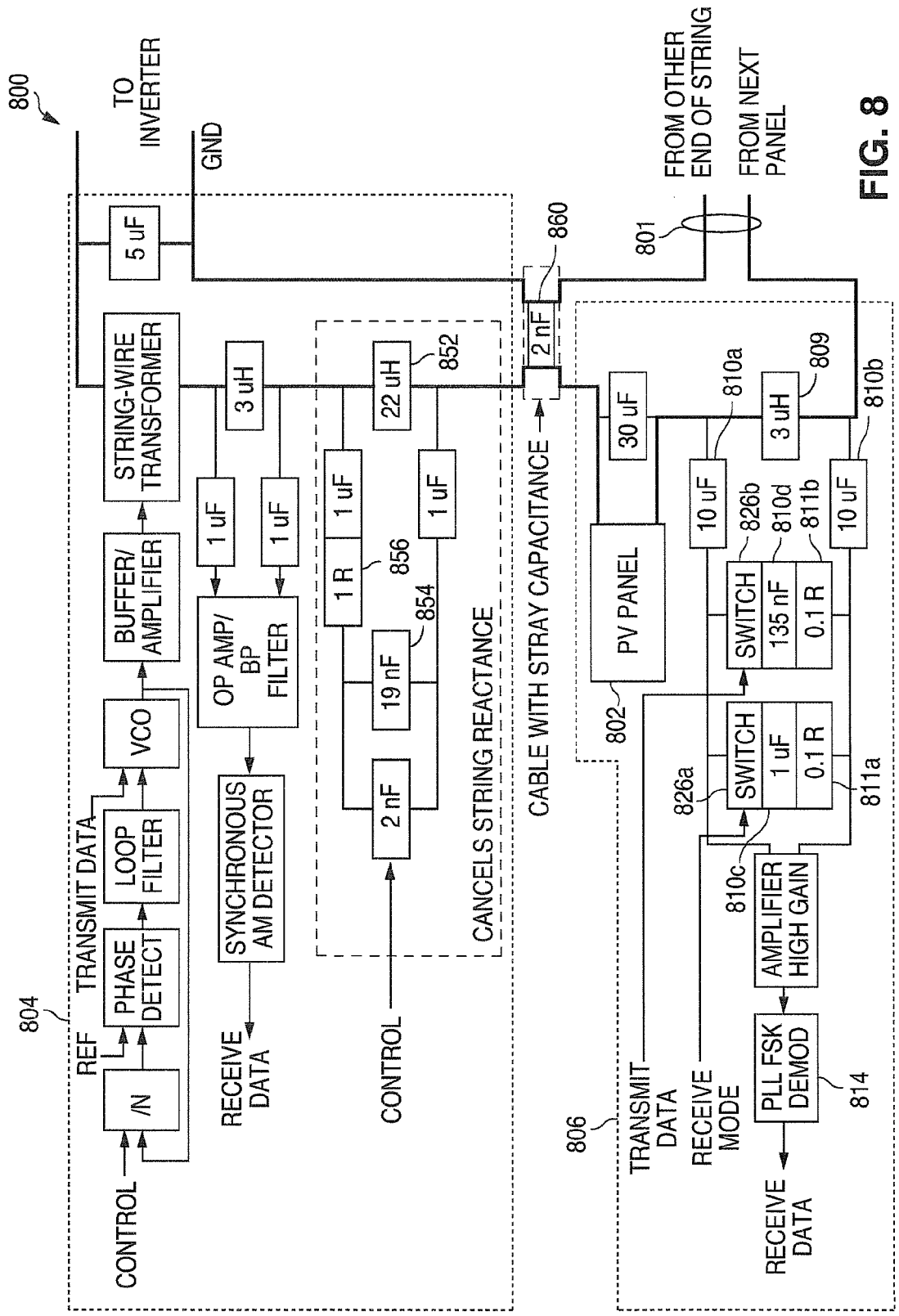

FIGS. 8 through 11 illustrate example ways in which master and slave modems can be implemented in the system 700 of FIG. 7A. As shown in FIG. 8, a system 800 is used in conjunction with a string of photovoltaic panels 802 and includes a master modem 804 and a slave modem 806 for each panel 802. The master modem 804 can be used within the combiner 710 and is similar in structure to the master modem 604 of FIG. 6. However, an inductor 852 could have an inductance of 22 μH, a capacitor 854 could have a capacitance of 19 nF, and a resistor 856 could have a resistance of 1Ω. Unlike FIG. 6 where the master modem 604 is coupled directly in series with the slave modems 606, the master modem 804 here is coupled indirectly to the slave modems 806, and a stray capacitance 860 (such as 2 nF) exists within a cable. In this example, carrier current from the master modem 804 is split between the stray capacitance 860 in the cable and the series string of slave modems 806.

The slave modem 806 includes many similar components as the slave modems described above. However, in this example, capacitors 810a-810b could represent 10 μF capacitors. Also, the slave modem 806 includes two switches 826a-826b, each associated with a capacitor 810c-810b and a resistor 811a-811b. The capacitor 810c could represent a 1 μF capacitor, and the capacitor 810d could represent a 135 nF capacitor.

As discussed above, the largest uplink signal from slave modems to a master modem could be obtained with the highest ratio of wiring loop current between two bit values, which can be augmented by reducing the overall string impedance.

Thus, the highest possible string current may be desired when a slave modem is sending a low-impedance bit value. Also as discussed above, a master modem could generate a capacitive reactance to reduce the wiring loop's inductive reactance. However, with the master modem 804 separated from the wiring loop 801 by the shunt capacitance of the cable, this may no longer be effective. Therefore, FIG. 8 implements another technique to reduce wiring loop impedance.

In the earlier embodiments, non-communicating slave modems could receive information and/or a poll for information from a master modem at any time. However, the inductive reactance of each slave modem's inductor adds to the inductive reactance of the wiring loop, thereby reducing the carrier current of a high-current symbol. In FIG. 8, each slave modem 806 that is not communicating is left in the low-impedance state, removing its inductive reactance and increasing carrier current. To prevent insufficient signal levels from appearing across the parallel combination of the inductor 809 and high-value capacitor 810c, a Receive Mode switch 826a is used. The switch 826a can be closed to receive data at a slower rate (such as 1 bps) or opened to receive data at a faster rate (such as 1 kbps).

When the slave modem 806 is in an active state and receiving data packets from the master modem 804, the capacitor 810c is not needed in the circuit, so the switch 826a is opened and the inductor 809 is not shorted. The receiver sees full signal strength and can decode data at the full bit rate. When the slave modem 806 is not in an active state, the switch 826a is closed, the large-value capacitor 810c is in the circuit to minimize inductive reactance of the loop, and the received signal is smaller. In order to decode the signal, detection circuitry (demodulator 814) has a narrow bandwidth, so data is sent at a very low rate. This low rate data can be used, for example, to address the slave modem 806 in order to wake it up into the active state.

Figure 9:
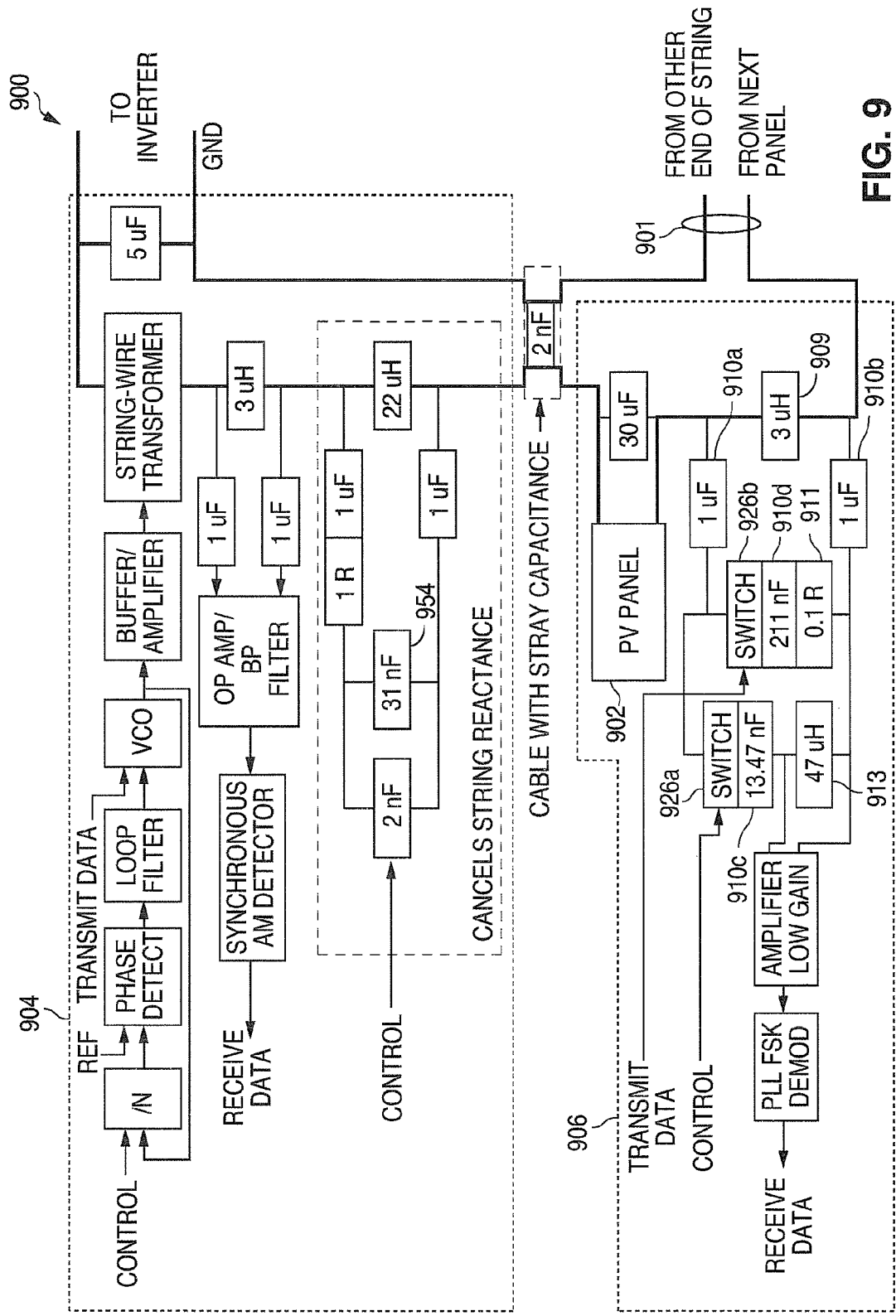

As shown in FIG. 9, a system 900 is used in conjunction with a string of photovoltaic panels 902 and includes a master modem 904 and a slave modem 906 for each panel 902. The master modem 904 is similar in structure to the master modem 804 of FIG. 8. However, a capacitor 954 could have a capacitance of 31 nF. Also, in the slave modem 906, capacitors 910a-910b could each have a capacitance of 1 µF.

In some embodiments, it may be desirable to avoid sending address data to inactive slave modems very slowly while still permitting the inactive slave modems to have a very low impedance to maximize string carrier current. In FIG. 9, a transmit data switch 926b opens and closes at the transmit data rate. For one symbol, the wiring loop carrier current may be undisturbed at a high value, with only the reactance of the single inductor 909 in the loop. For the other symbol, the capacitor 910d is switched to be across the inductor 909 to form a parallel-resonant circuit at the carrier frequency (such as at 200 kHz), thus interrupting the carrier current flow. While in receive mode, the switch 926b can be opened, removing the capacitor 910d from the circuit.

In this configuration, only a single receive mode is needed to cover the active and inactive states of the slave modem 906. A capacitor 910c and an inductor 913 in series with a switch 926a form a series-tuned circuit at the carrier frequency. The switch 926a can be closed in receive mode and opened in transmit mode. In receive mode, there is a very low impedance across the inductor 909 and a large carrier current flowing through the series-tuned circuit. Nevertheless, the receiver input is connected across only the inductor 913 or capacitor 910c (in this case, the inductor 913). Therefore, even though the wiring loop 901 sees a short circuit across this modem, the receiver input sees a large carrier voltage (essentially the string loop current multiplied by the reactance of the inductor 913). Thus, whether the slave modem 906 is active or inactive, the slave modem can receive with full sensitivity.

Another feature of this embodiment is that the switches 926a-926b can be operated together to transmit data at the data rate. For a low impedance symbol, the impedance can be closer to zero than if the inductor 909 was present by itself. The low-impedance symbol could have the reactance from the inductor 909 shorted out.

Figure 10:
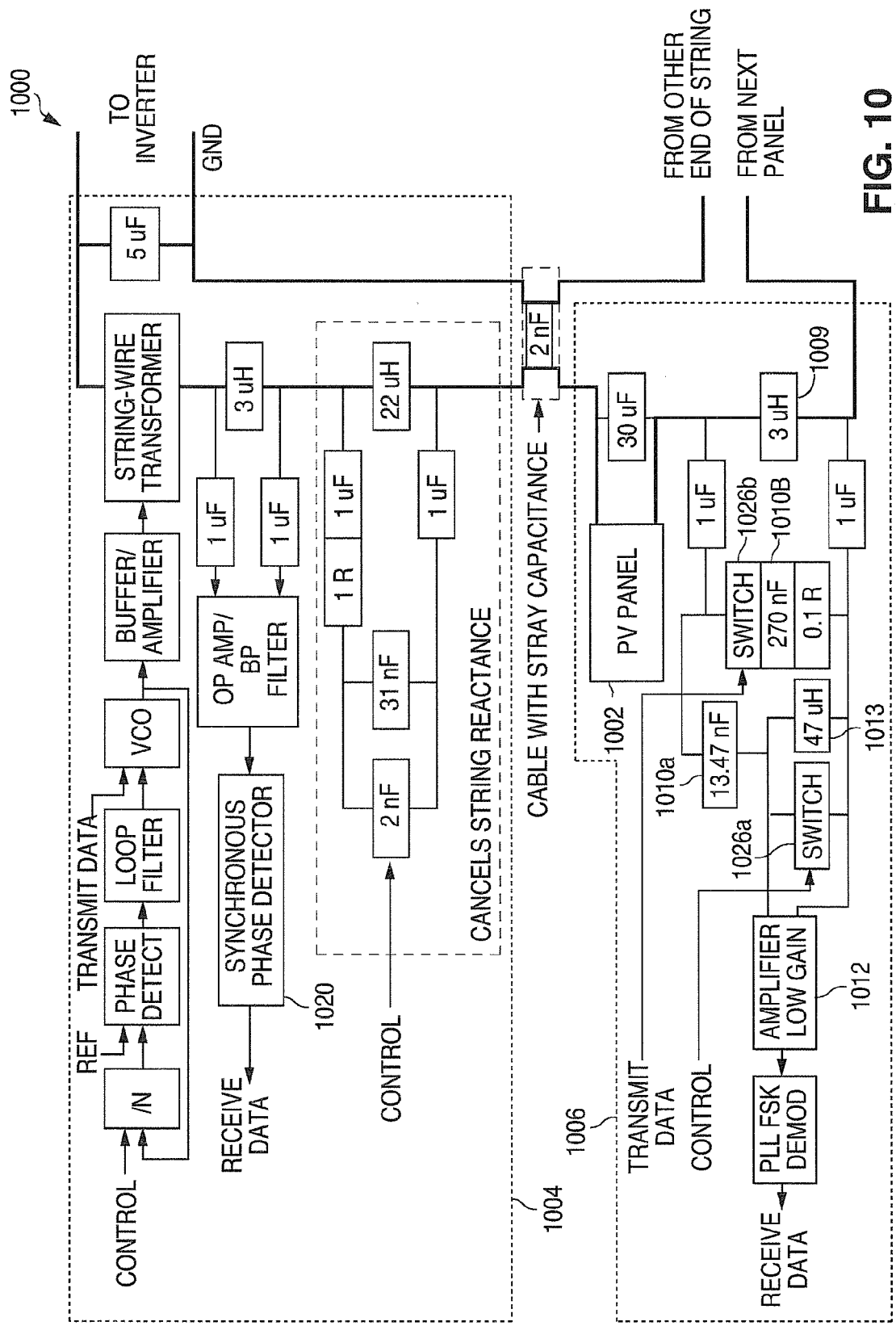

As shown in FIG. 10, a system 1000 is used in conjunction with a string of photovoltaic panels 1002 and includes a master modem 1004 and a slave modem 1006 for each panel 1002. The master modem 1004 is similar in structure to the master modem 904 of FIG. 9. However, the master modem 1004 uses a synchronous phase detector 1020, which supports the use of phase shift keying by the slave nodes 1006. The master node 1004 can still use FSK modulation to communicate with the slave modem 1006.

The slave modem 1006 is also similar in structure to the slave modem 906 of FIG. 9. However, the series-tuned circuit in the slave modem 1006 is different. In this example, the input to a receive amplifier 1012 is taken across both an inductor 1013 and a switch 1026a. The series-tuned circuit is formed by a capacitor 1010a coupled in series with the inductor 1013. In receive mode, the switch 1026a is left open so that the series-tuned circuit can function at the carrier frequency, such as about 200 kHz. A transmit data switch 1026b is also left open in this mode. The series-tuned circuit presents a very low impedance to the string loop that maximizes the string current, but a large carrier voltage appears across the amplifier 1012 because it sees only the inductor 1013, not the entire tuned circuit. In transmit mode, the switch 1026a is closed, short circuiting the receive amplifier 1012 and leaving only the capacitor 1010a across the inductor 1009 that is in series with the string. This parallel LC circuit resonates above the carrier frequency, such as at 420 kHz (well above a 200 kHz carrier frequency). Also, a capacitor 1010b could have a capacitance of 270 nF. When the switch 1026b is closed, the parallel LC circuit includes the capacitors 1010a-1010b and the inductor 1009. The parallel resonance frequency can be lower than the carrier frequency, such as at 173 kHz (considerably lower than the 200 kHz carrier frequency). Phase shift keying can be effected with the capacitor 1010b being switched in and out at a data rate by the transmit data switch 1026b. Maximum possible phase shift can be obtained by the relatively-high Q parallel LC circuit having its resonance frequency switching from above to below the carrier frequency and vice versa. The phase shift with the parallel resonance frequency above the carrier frequency could be designated the "Mark" symbol value, and the other condition could be designated as the "Space" symbol value.

Figure 11:
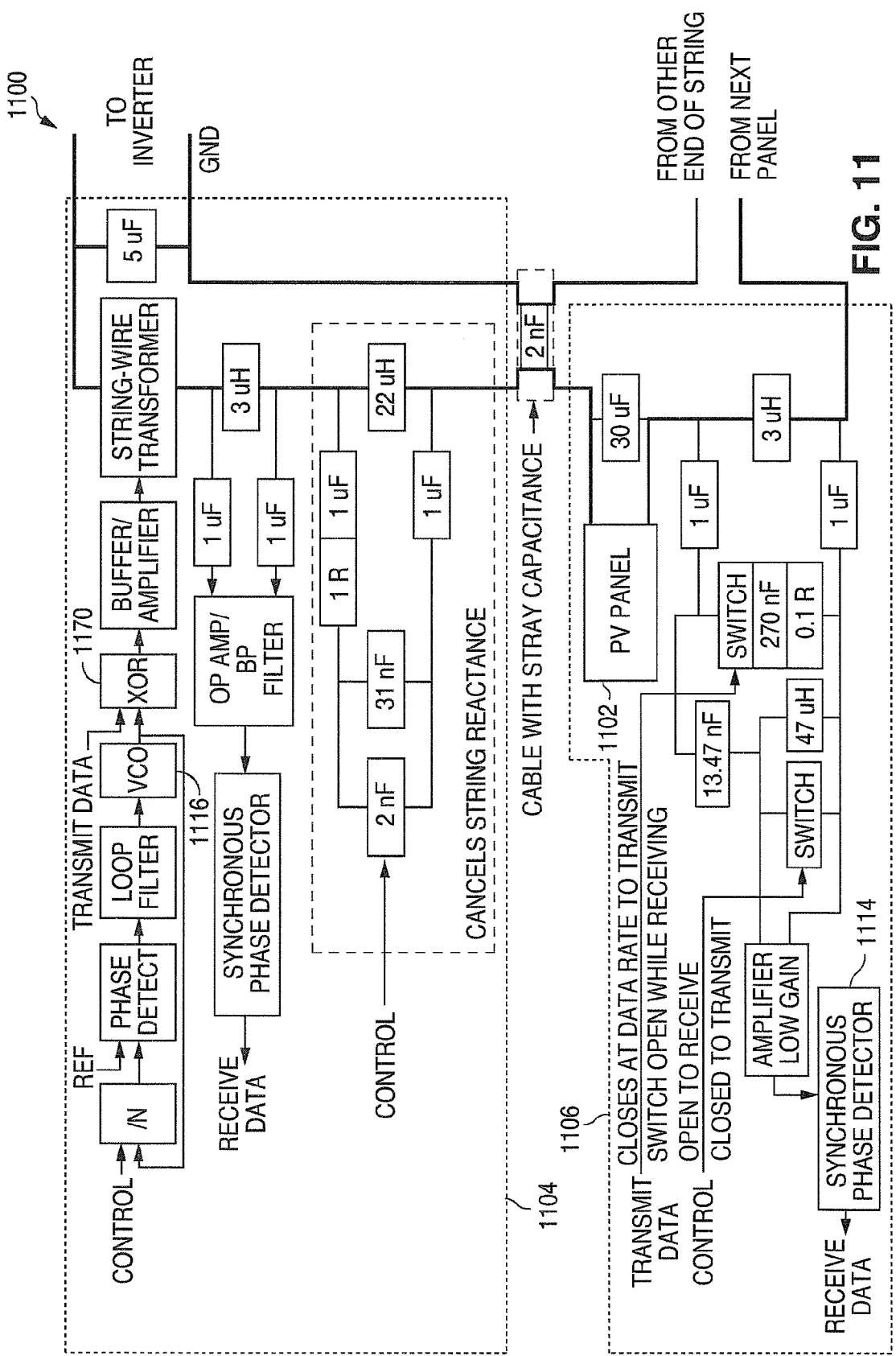

As shown in FIG. 11, a system 1100 is used in conjunction with a string of photovoltaic panels 1102 and includes a master modem 1104 and a slave modem 1106 for each panel 1102. The slave modem 1106 is identical in structure to the slave modem 1006 of FIG. 10, except the slave modem 1106 uses a synchronous phase detector 1114 as a demodulator. This supports the receipt of BPSK signals generated by the master modem 1104. The master modem 1104 includes an XOR unit 1170 in the transmit signal path, and the transmit data is provided to the XOR unit 1170 instead of an oscillator 1116. This supports the use of BPSK and allows a PLL synthesizer with a high-speed loop to be used in the oscillator.

In various embodiments described above, the high/low carrier current ratio for digital data symbols is increased or maximized by causing all slave modems in a string to clamp to a low-impedance state, except for the slave modem that is transmitting. This slave modem then toggles between high- and low-impedance states at a data rate to modulate data onto the carrier signal generated by the master modem.

Figure 12:
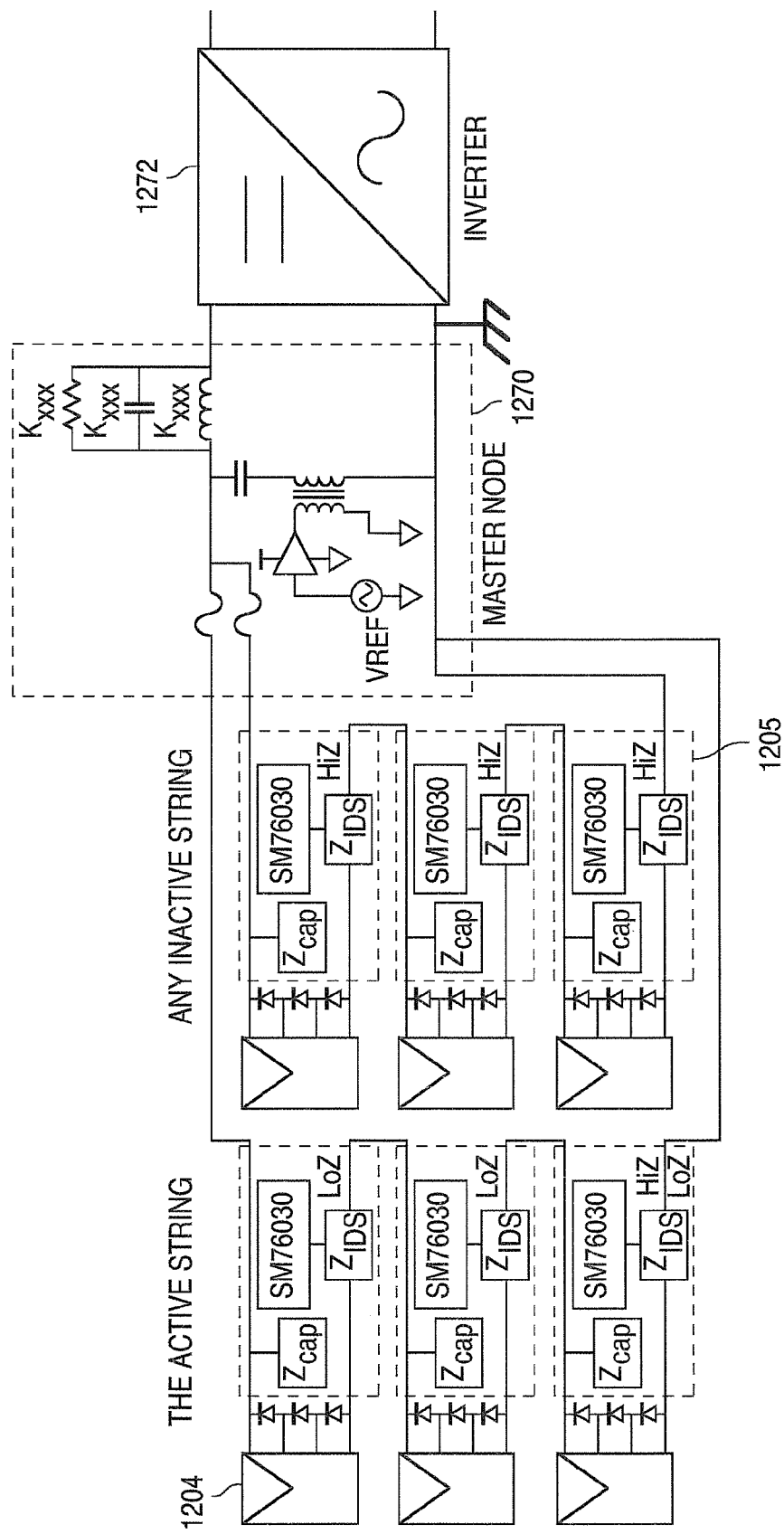

FIG. 12 illustrates yet another example photovoltaic system 1200 using a distributed modem architecture for wired communications. In FIG. 12, a single master modem in a master node 1270 communicates with slave modems in panel assemblies 1205 for multiple strings of photovoltaic panels 1204. However, the master modem still sees a usable percentage change of carrier current to distinguish between digital symbols.

In this example, when a slave modem is transmitting to the master modem, other slave modems in the same string (the "active" string) enter a low-impedance state, and the transmitting slave modem can toggle between the low-impedance state and the high-impedance state. The slave modems in other strings (the "inactive" strings) enter the high-impedance state to help reserve carrier current for the active string. In this way, an increased or maximum amount of carrier current can be generated by minimizing the impedance of the wiring loop subsystem as a whole, including the panels 1204 and associated wiring.

While FIG. 12 shows only one inactive string, there could be any number of inactive strings. Also, FIG. 12 shows only three photovoltaic panels per string, but there could be any number of panels per string (such as between four and 24).

Figure 13:
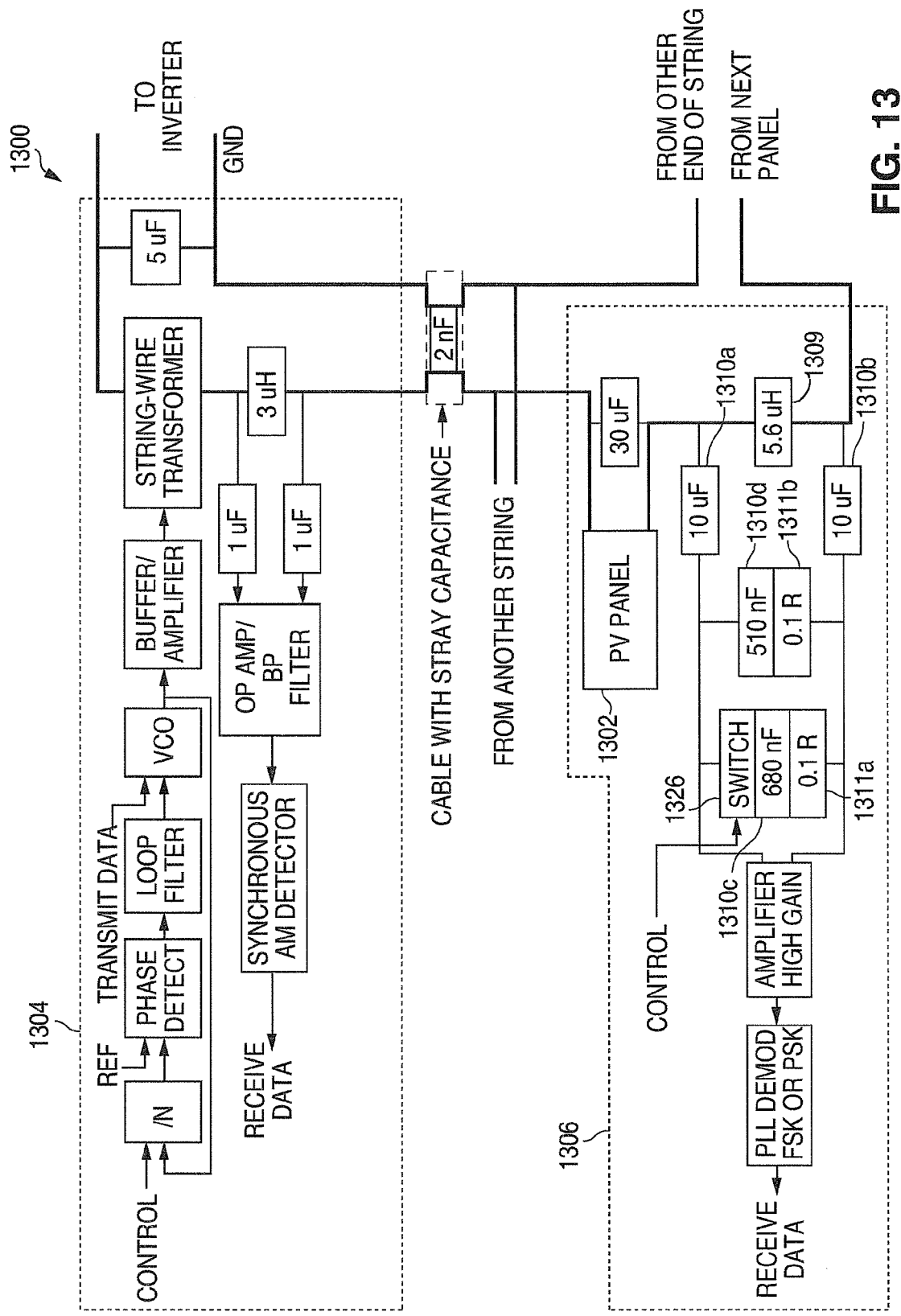

As shown in FIG. 13, a system 1300 is used in conjunction with a string of photovoltaic panels 1302 and includes a master modem 1304 and a slave modem 1306 for each panel 1302. In this example, the master modem 1304 is similar in structure to the master modems 804 and 904. In the slave modem 1306, an inductor 1309 could have an inductance of 5.6 µH, and capacitors 1310a-1310b could each have a capacitance of 10 µF. Also, a capacitor 1310c could have a capacitance of 680 nF, and a capacitor 1310d could have a capacitance of 510 nF. A switch 1326 can be opened when the panel 1302 is in an inactive string or when data or commands are being received. The switch 1326 can be closed when the panel 1302 is inactive when in an active string, and the switch 1326 can be opened and closed when data is being transmitted from that panel.

In FIG. 13, a technique similar to that shown in FIG. 3 is used to reduce or minimize the string loop subsystem impedance within each slave modem 1306. The capacitor 1310c is switched at a data rate in parallel with the electronics-side transformer winding of a transformer or (in this case) the inductor 1309.

FIG. 13 also shows an increased inductor value of the inductor 1309 to increase the impedance in the high-impedance state. Increasing loop impedance for the high-impedance state and decreasing loop impedance for the low-impedance state together can increase the Mark/Space carrier current ratio measured at the master modem 1304 while receiving uplinked data.

In several prior embodiments, slave modems in the same string as the slave modem being addressed are brought to low impedance with an extra shunt capacitor (such as 10 µF) in order to maximize string carrier current during the bit periods that use the high-current symbol. This can be done to achieve a large current ratio between the Mark and Space symbols. For these embodiments, one limit of current on the high side is the wiring loop's inductive reactance.

Also, in several prior embodiments, a technique is used to cancel or partially cancel wiring loop reactance by adding series capacitive reactance in such a way that DC continuity is maintained for the system's basic electrical power delivery function. This technique makes use of the capacitive reactance created by a parallel-tuned circuit resonated slightly below the carrier frequency. For embodiments having the master modem directly at the end of a string loop, this technique can be used at the master modem to remove a large percentage of the loop's inductive reactance.

There could be several advantages to reducing a string's inductive reactance at each slave modem instead of at the master modem. The slave modems are within the string, not separated by a cable to a combiner. Also, there typically exists in standard products a string inductive reactance reduction that is roughly proportional to the length of the string wiring loop. For instance, the string wire itself could contribute 100 µH for a string having 24 panels. This means that the slave modem for each panel may only need to cancel the reactance resulting from about 4 µH, and the string reactance can be cancelled as needed without having to guess how many panels are in the string for a given installation. Further, inasmuch as each slave modem needs to generate a small amount of capacitive reactance, the resonance frequency of the parallel-tuned circuit may not need to be so close to the carrier frequency.

In FIG. 13, the value of the capacitor 1310c can be selected so that, when the capacitor 1310c is connected in parallel with the capacitor 1310d and the inductor 1309, there exists a capacitive reactance in series with the line. The absolute value of the capacitive reactance can equal the inductive reactance of the incremental portion of the line that was needed to insert the panel 1302, thus working together with other panels in the string that are similarly configured to allow very high carrier current. For the slave modem 1306 that is transmitting, the other symbol (using the capacitor 1310d alone) would present a higher parallel-tuned circuit impedance, which can reduce the carrier current significantly (such as by a factor of 30 or more).

When a particular slave modem 1306 is transmitting, other slave modems in the same string can be in the mode where almost no impedance is created, helping to keep the line impedance down. The transmitting slave modem goes back and forth at the bit rate to change the impedance and transmit data. The slave modems in the other strings can stay at the high-impedance state. If a higher-value inductor 1309 is used (such as 5.6 µH versus 3.3 µH), almost three times the impedance can be obtained.

Generating a small amount of capacitive reactance with a parallel LC circuit to cancel the inductive reactance of an incremental segment of the string (as opposed to generating a large enough reactance with a parallel LC circuit to cancel the inductive reactance of the entire string) reduces or eliminates the problem of incurring a parallel resonance so close to the carrier frequency. For example, if the carrier frequency is at 96.87 kHz, the parallel resonance frequency that creates a 2.54 R capacitive reactance could be down at 72.92 kHz. In addition, there may be virtually no real component.

Slave modems 1306 in inactive strings can be placed in the high-impedance state by opening their respective switches 1326. Slave modems 1306 in the active string, except for the slave modem that is communicating, can be placed in the low-impedance state by closing their respective switches 1326. The slave modem 1306 that is communicating has its switch 1326 closing and opening at the bit rate to send data. To receive data, its switch 1326 can be opened (high impedance). A single string can operate in the same way as if there are multiple strings. In the quiescent state, all slave modems 1306 can be in the high-impedance state.

A further advantage to this technique is that the slave modem 1306 presents a small capacitive reactance for the high-current symbol. Creating the high-current state with a large shunt capacitor could make it difficult for inactive nodes to see a polling signal voltage across this capacitor. In FIG. 13, the carrier current passing through a finite capacitive reactance creates a receive voltage even for the nodes configured in the low impedance state.

Figure 14:
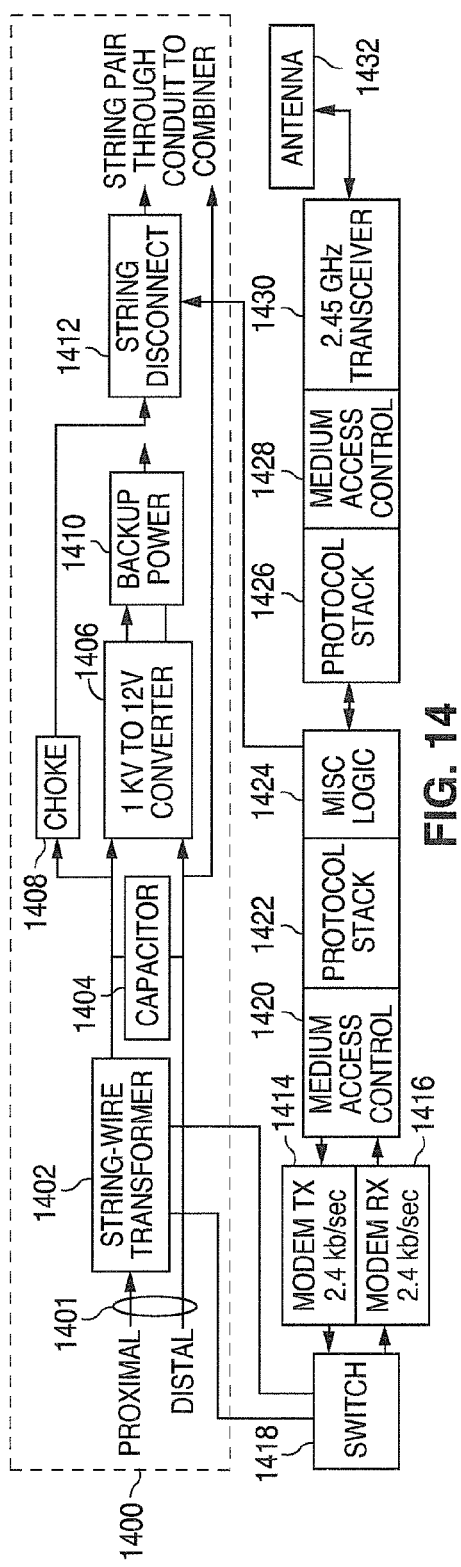
Figure 15:
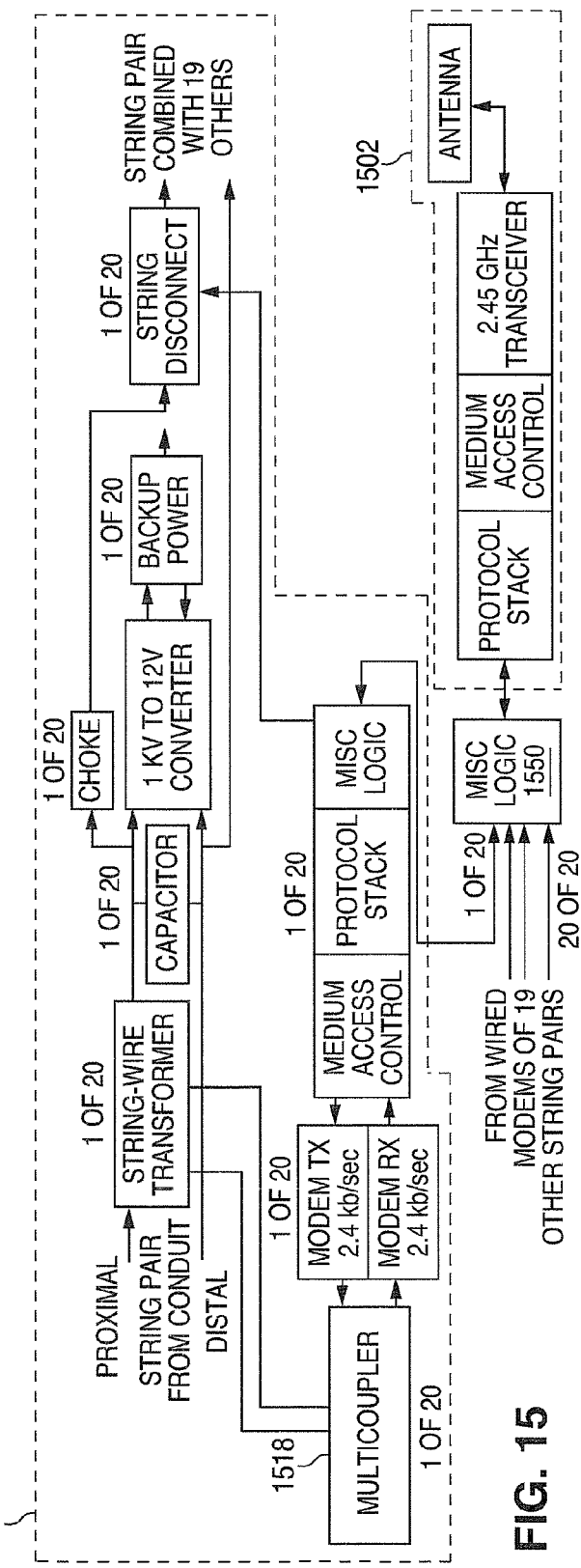
Figure 16:
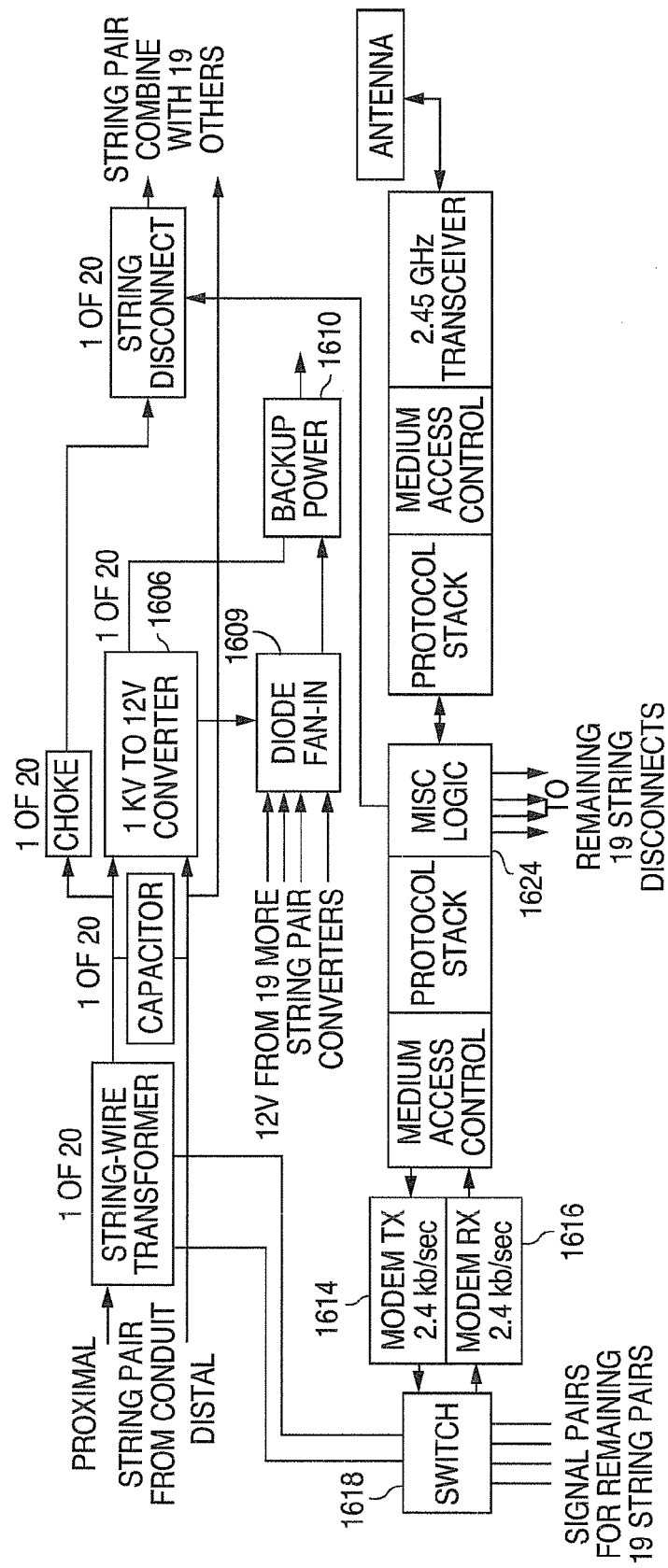

FIGS. 14 through 16 illustrate different communication and power arrangements involving a master modem. As shown in FIG. 14, components within a dashed box 1400 couple a master modem to a string wiring loop 1401 and power the master modem. The arrangement in FIG. 14 could be used with any of the master modems shown in FIGS. 2 through 6.

In this example, a proximal wire in the wiring loop 1401 is coupled to a string-side winding of a transformer 1402, a capacitor 1404, a voltage converter 1406, and a choke 1408. A distal wire in the wiring loop 1401 is also coupled to the capacitor 1404 and the voltage converter 1406. The capacitor 1404 can store energy received over the wiring loop 1401, such as for use at nighttime when solar panels are not generating energy. The voltage converter 1406 converts a voltage from either the transformer 1402 or the capacitor 1402 to a voltage suitable for use by a master modem. In some embodiments, the voltage converter 1406 converts a 1 kV input to a 12V output. In particular embodiments, the master modem operates at 12V and 40 mA during receive operations, 100 mA during transmit operations, and 5 µA during sleep. A backup power unit 1410 could be charged by or otherwise used to store energy from the voltage converter 1406. A string disconnect unit 1412 can physically disconnect the wiring in the loop 1401.

The remaining components in FIG. 14 could represent the master modem and a wireless radio. In particular, the modem's transmit circuitry 1414 and receive circuitry 1416 communicate through the transformer 1402 via a switch 1418. In this example, the circuitries 1414-1416 communicate at 2.4 kbps, although other data rates could be used. Also, as shown in various figures above, transmit circuitry 1414 and receive circuitry 1416 need not communicate through the same transformer via a switch.

A medium access control (MAC) layer 1420 and protocol stack 1422 support access to the transmit circuitry 1414 and receive circuitry 1416. A miscellaneous logic unit 1424 performs various higher-level functions, such as determining whether to operate the switch disconnect unit 1412 or transporting data between the master modem and the wireless radio. A protocol stack 1426 and MAC layer 1428 support access to a wireless transceiver 1430 (such as a 2.45 GHz transceiver), which communicates wirelessly using at least one antenna 1432.

The arrangements in FIGS. 15 and 16 could be used with any of the master modems shown in FIGS. 7 through 13. In FIG. 15, components within a dashed box 1500 couple a master modem to multiple string wiring loops (twenty loops in this case) and power the master modem. Also, items within a dashed box 1502 support wireless communications using a wireless radio. In FIG. 15, the items within the dashed boxes 1500-1502 may be the same as or similar to the corresponding components in FIG. 14, except the switch 1418 has been replaced with a multi-coupler 1518 and there are multiple instances of each component in the box 1500 (one per wiring loop). In addition, a miscellaneous logic unit 1550 can support various monitoring or other functions for multiple strings of photovoltaic panels.

The arrangement shown in FIG. 16 is similar to the arrangement shown in FIG. 15. However, a switch 1618 is coupled to multiple signal pairs, and transmit and receive circuitries 1614-1616 operate at higher frequencies (such as 24 kbps). Also, a single miscellaneous logic unit 1624 is used for the multiple wiring loops, and a diode fan-in 1609 is coupled between multiple power converters 1606 and a single backup power unit 1610.

The arrangements in FIGS. 14 through 16 illustrate various ways in which a master modem can by physically coupled to one or multiple string wiring loops and powered. However, any other suitable arrangement could be used.

Figure 17:
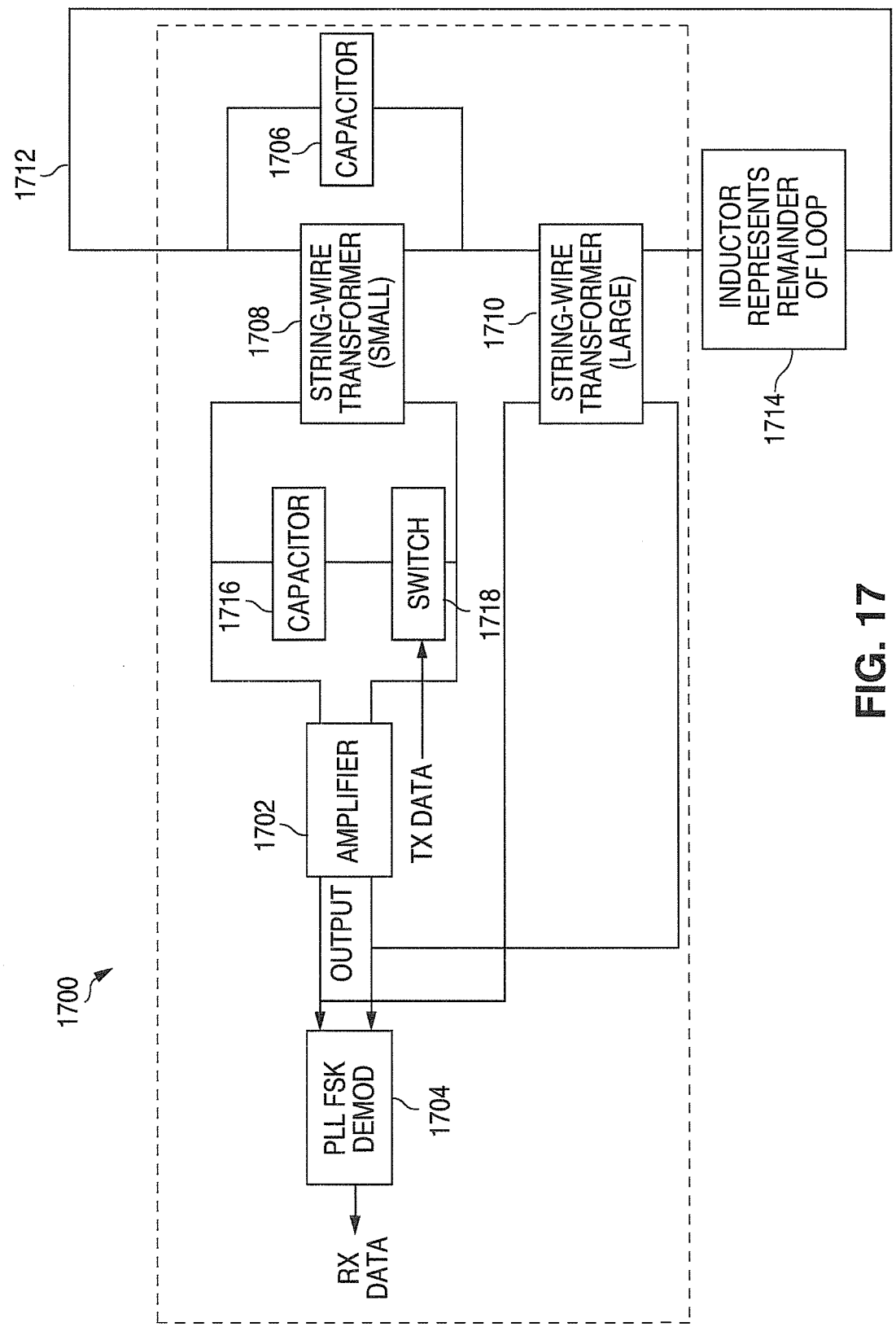

FIG. 17 illustrates an example master modem 1700 with a string loop inductor oscillator. The string loop inductor oscillator shown here could be used in any of the master modems discussed above. However, the master modems discussed above could use any other suitable oscillators.

As shown in FIG. 17, the master modem 1700 includes an amplifier 1702 and a demodulator 1704 (such as a PLL-based FSK demodulator). These components operate using the output of the oscillator to generate receive data for the master modem. The oscillator is implemented here using a capacitor 1706 coupled across a transformer 1708 and to a transformer 1710. The two transformers 1708-1710 are coupled to a string wiring loop 1712, which has a loop inductance 1714 (such as 130 µH). The capacitor 1706 operates with a winding of the transformer 1708 (such as a 3 µH winding) to produce a reactance, such as a reactance of −208.9Ω at 250 kHz. The transformer 1710 can operate with the loop inductance 1714 to create another reactance, such as +208.9Ω at 250 kHz.

In FIG. 17, a capacitor 1716 and a switch 1718 are coupled across the transformer 1708. The capacitor 1716 can alter the frequency of the oscillator, such as by several kilo-Hertz. As a result, the switch 1718 can be operated using the transmit data to frequency modulate data onto the oscillator signal. However, other modulation techniques could also be used.

Although FIGS. 2 through 17 illustrate specific examples of distributed modem architectures for wired communications, various changes may be made to FIGS. 2 through 17. For example, while certain circuit arrangements are used to implement specific functions, these functions could be implemented using any other circuit arrangements. Also, specific component values (such as voltages, currents, capacitances, inductances, and resistances) are described above and shown in the figures. However, these values are for illustration and explanation only, and these values are approximate values only. In addition, features shown in one or more of FIGS. 2 through 17 could be implemented in others of FIGS. 2 through 17. In addition, note that various forms of frequency, phase, and/or amplitude shift keying can be used in either direction of communication.

Figure 18:
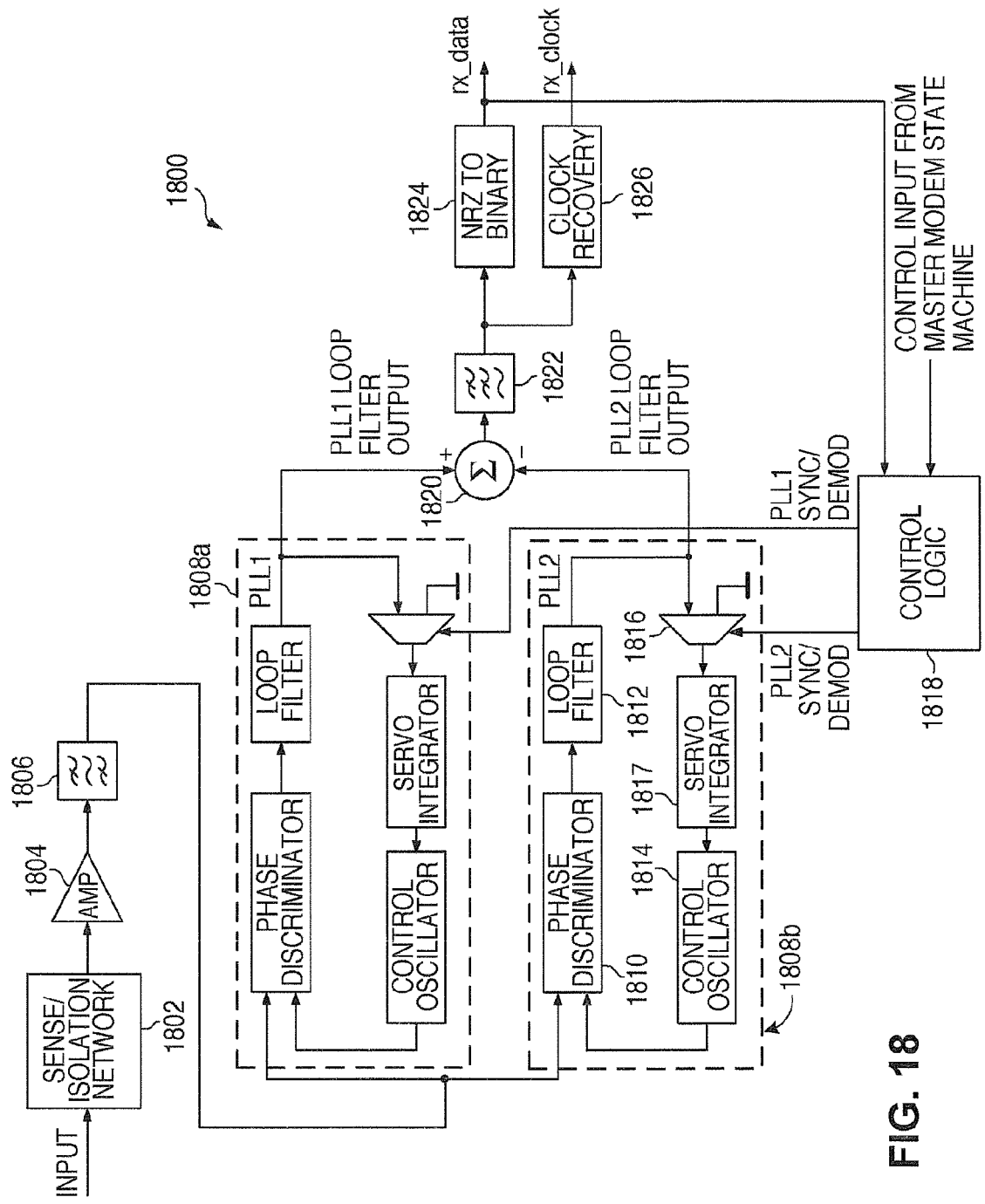
FIG. 18 illustrates an example technique for phase shift keying (PSK) demodulation in a distributed modem architecture according to this disclosure, and FIGS. 19A-19B (FIGS. 19A/19C and FIGS. 19B/19D) are associated timing diagrams.
Figures 19, 19A:
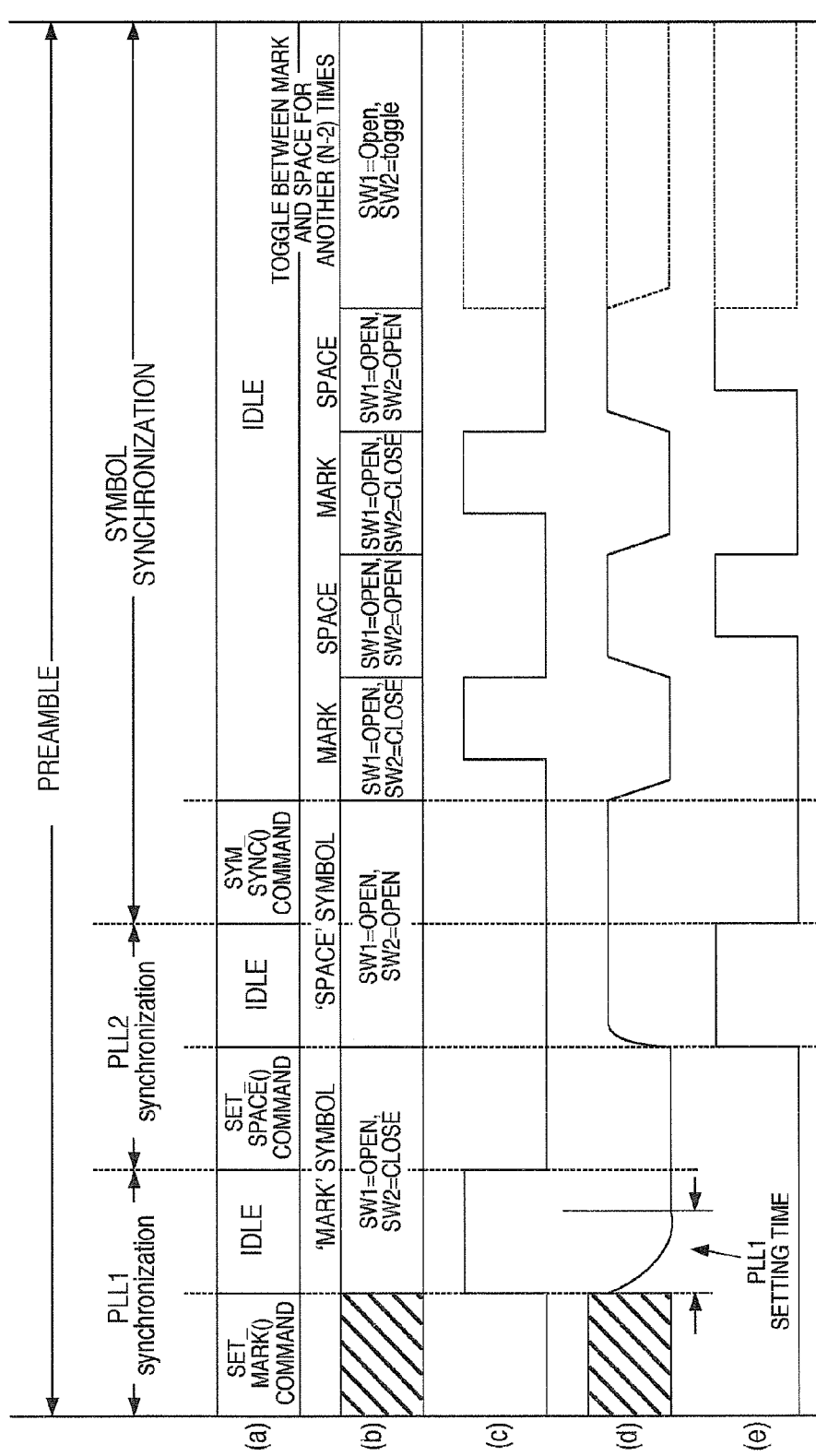
Figure 19B:
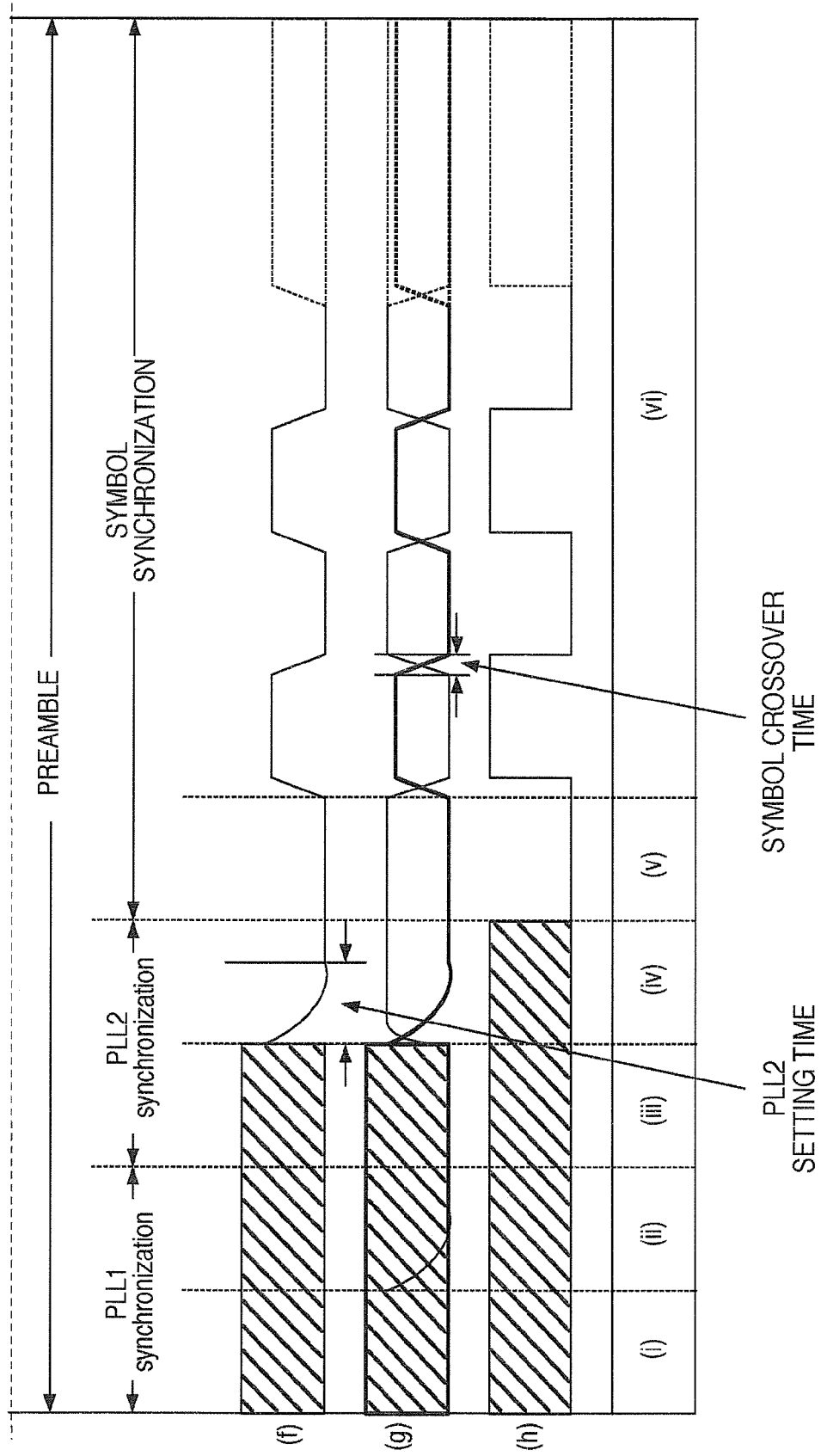

As noted earlier, various embodiments of the distributed modem architectures described above could support various forms of PSK modulation and demodulation. FIGS. 18 through 19B illustrate an example technique for phase shift keying (PSK) demodulation in a distributed modem architecture according to this disclosure. Note that the technique shown here is not limiting, and the distributed modem architectures could use other techniques for PSK demodulation.

Conventional coherent methods for detecting binary PSK modulated signals (such as Square-law detectors or Costas Loop receivers) can often only recover symbols if the phase deviation between Mark and Space is maintained at or close to 180°. As shown in FIGS. 10 and 11, however, these conventional techniques might experience problems if used in the synchronous phase detector of a master modem for receiving data from slave modems. There are several reasons for this. Phase offset for Mark and Space symbols with reference to the carrier generated by the master modem could have arbitrary values between −180° and +180°, and they could change from one slave modem to another. Also, the Mark symbol may phase lead the Space symbol when a particular slave modem is transmitting, and the Mark symbol may phase lag the Space symbol when another slave modem is transmitting. Further, the phase deviation between Mark and Space can be any value between −180° and +180°, and again it can change from one slave modem to another. In addition, changes in values of reactive components used for impedance shift keying (such as components 1010a, 1010b, and 1013), the 3 μH or other inductor, and other components on the string can result in different phase offsets and phase deviations for a particular slave modem. These changes can result from part replacement, environmental conditions, component tolerances, or other factors.

To address these types of problems, a data-aided carrier synchronization technique could be used in a receiver (such as a receiver in the master modem). In this technique, a preamble or training sequence can be sent before actual data transmission starts. An adaptive synchronization algorithm at the receiver can then extract the carrier and symbol timing information from the preamble and use this information to capture the actual data from a slave modem.

FIG. 18 illustrates an example receiver 1800 for use in a distributed modem architecture, such as in a master modem. A received signal is sensed across a sense/isolation network 1802, such as a 3 μH inductor. The signal is pre-processed using an amplifier 1804 and a filter 1806, such as a band-pass filter. This amplifies and isolates the signal in a band of interest to a suitable level before feeding it to a synchronous phase detector formed from two independent phase locked loops (PLLs) 1808a-1808b. Each PLL 1808a-1808b includes a phase discriminator 1810, a loop filter 1812 (such as a low-pass filter), and a control oscillator 1814.

Each PLL 1808a-1808b also includes a servo integrator 1817 and a two-channel multiplexer 1816 in the feedback path, which is used to feed a phase error back to the voltage or current-controlled oscillator 1814 in that PLL. The servo integrator 1817 can have one input grounded and an output coupled to the oscillator 1814. A control logic unit 1818 generates a select signal for each of the multiplexers 1816 so that each PLL can be operated in two different modes: SYNC and DEMOD.

In SYNC mode, a phase error output from the loop filter 1812 is fed to the control oscillator 1814 via the multiplexer 1816. This aligns the phase and frequency of the control oscillator 1814 with an incoming reference signal from the filter 1806. To reduce PLL settling time, at the beginning of the SYNC mode, the control oscillator 1814 can be set to the same carrier signal frequency generated by the master oscillator in the master modem. This could be done, for instance, by connecting PLL1 and PLL2 to the output of the master oscillator during the idle periods between transmissions.

In DEMOD mode, the phase error output from the loop filter 1812 is blocked by the multiplexer 1816, and the servo integrator 1817 driving the voltage/current-controlled oscillator 1814 receives a grounded input signal. The output of the control oscillator 1814 is used as the reference input to the phase discriminator 1810 for comparing to the phase of the input signal from the filter 1806.

The outputs from the PLLs 1808a-1808b are compared using a differential comparator 1820. The output of the comparator 1820 is demodulated data in non-return-to-zero (NRZ) format. A filter 1822 (such as a low-pass filter) at the output of the comparator 1820 reduces high-frequency or other noise in the demodulated signal. A quantizer or decision circuit 1824 translates the demodulated data from NRZ format, such as to binary format using a zero-crossing comparator circuit. A clock recovery circuit 1826 recovers a clock signal using the demodulated data. Any suitable technique can be used to recover a symbol clock from demodulated data, such as the early-late gate algorithm that exploits the symmetry properties of the demodulated output signal to generate the recovered clock.

FIGS. 19A-19D (divided into FIGS. 19A/19C and FIGS. 19B/19D) illustrates a timing diagram 1900 showing how carrier and symbol synchronization can be achieved at the master modem's receiver during a preamble phase before demodulating actual data during a data phase. In FIGS. 19A/19C, row (a) represents commands transmitted from a master modem to a slave modem, and row (b) denotes slave modem impedance modulator actions to transmit Mark and Space symbols to the master modem. Row (c) denotes the PLL2 SYNC/DEMOD signal in FIG. 18 for the PLL 1808b, and row (d) denotes the loop filter output of the PLL 1808b. The "select" input to the multiplexer 1816 in the PLL 1808b could be logic HIGH to indicate SYNC mode and logic LOW to indicate DEMOD mode. Similarly, row (e) denotes the PLL1 SYNC/DEMOD signal in FIG. 18 for the PLL 1808a. In FIGS. 19B/19, row (f) denotes the loop filter output of the PLL 1808a. The "select" input to the multiplexer 1816 in the PLL 1808a could be logic HIGH to indicate SYNC mode and logic LOW to indicate DEMOD mode. Row (g) denotes the overlapping loop filter outputs from the PLLs 1808a-1808b, and row (h) denotes recovered data symbols from the quantizer or decision circuit 1824.

In FIGS. 19A/19C and 19B/19D, the timing diagram 1900 contains columns (i) through (vii), which denote different periods of time. In column (i), the master modem commands the slave modem to transmit the Mark symbol by sending a message SET_MARK( ). In column (ii), the slave modem acknowledges the master modem by transmitting the Mark symbol. The transmission of the Mark symbol at the slave modem can be achieved, for example, by keeping the switch 1026a closed and opening the switch 1026b. The master modem's state machine sets the PLL 1808b in SYNC mode through the control logic unit 1818 so that the PLL 1808b synchronizes with the phase of the Mark symbol. As can be seen from row (d) in FIG. 19, following the transient lock-up period, the output of the loop filter 1812 (fed by this particular type of phase discriminator 1810, for example) is low, showing that the control oscillator matches phase with that of the incoming signal.

In column (iii), after the PLL 1808b settling time, the master modem commands the slave modem to transmit the Space symbol by sending a message SET_SPACE( ). At this time, the master modem's state machine sets the PLL 1808b in DEMOD mode so that the oscillator 1814 of the PLL 1808b can no longer track the phase of the incoming signal and instead freezes at its present frequency and phase, because both of its integrator inputs are grounded. As can be seen in row (d) of FIG. 19A, in this time slot, the output of the loop filter 1812 remains low because the incoming signal has not yet changed its phase.

In column (iv), the slave modem acknowledges the master modem by transmitting the Space symbol. The transmission of the Space symbol by the slave modem can be achieved, for example, by keeping the switch 1026a and the switch 1026b opened. The master modem's state machine sets the PLL 1808a in the SYNC mode through the control logic module 1818 so that the PLL 1808a synchronizes with the phase of the Space symbol. This can be seen in row (f), where the outputs of the phase discriminator 1810 and loop filter 1812 of the PLL 1808a slew to the low level. Notice also that in row (d), the phase discriminator 1810 and loop filter 1812 change to the high state because the incoming signal is no longer at the "Mark" phase at which the oscillator 1814 has been frozen.

In column (v), after the PLL 1808*a* settling time, the master modem commands the slave modem to toggle between Mark and Space symbols for N symbol periods. At this time, the master modem's state machine sets the PLL 1808*a* in DEMOD mode so that the PLL 1808*a* is also in a frozen state.

In column (vi), the slave modem acknowledges the master modem by transmitting the Mark and Space symbols alternatively separated by one symbol period. This can be achieved, for example, by keeping the switch 1026*a* closed and toggling the switch 1026*b* using the transmit data. The receiver at the master modem demodulates and recovers symbols transmitted by the slave modem. The receiver at the master modem also recovers the symbol clock embedded in the transmitted data. As seen in FIG. 19A, row (d) has returned to a low state signal, detecting the "Mark" phase that matches the phase of PLL2's oscillator 1814. Row (f) shows a high state signal, detecting that PLL1's phase discriminator 1810 is no longer seeing the "Space" phase to match that of its oscillator 1814. Notice that row (h) is at a high digital state, reflecting the fact that the differential comparator 1820 sees a high level at its non-inverting input from PLL1 and a low level at its inverting input from PLL2. Assuming there is no drift in the Mark and Space phase values that reach the master modem or no drift in the oscillators 1814 while in frozen, both PLL1 and PLL2's oscillators 1814 can continue to be held in their frozen states until the end of a packet.

However, as shown in FIG. 18, the received symbols after the quantizer or decision circuit 1824 are provided in a feedback path to the control logic unit 1818. If the received symbol is a Mark, the control logic unit 1818 transitions the PLL 1808*b* into the SYNC mode from the DEMOD mode after the symbol crossover time, while the PLL 1808*a* is operating in the DEMOD mode only. The PLL 1808*b* is transitioned back to the DEMOD mode from the SYNC mode when the symbol period time elapses. The transitioning of the PLL 1808*b* into the SYNC mode from the DEMOD mode when a Mark symbol is received allows the PLL 1808*b* to track the Mark symbol phase and frequency, which might be experiencing drift due to instability in the master oscillator's clock and the control oscillator 1814 in the PLL 1808*b*. Similarly, if the received symbol is a Space, the control logic unit 1818 transitions the PLL 1808*a* into the SYNC mode from the DEMOD mode after the symbol crossover time, while the PLL 1808*a* is operating in the DEMOD mode only. Refer again to row (c) of FIG. 19.

Figure 19C:
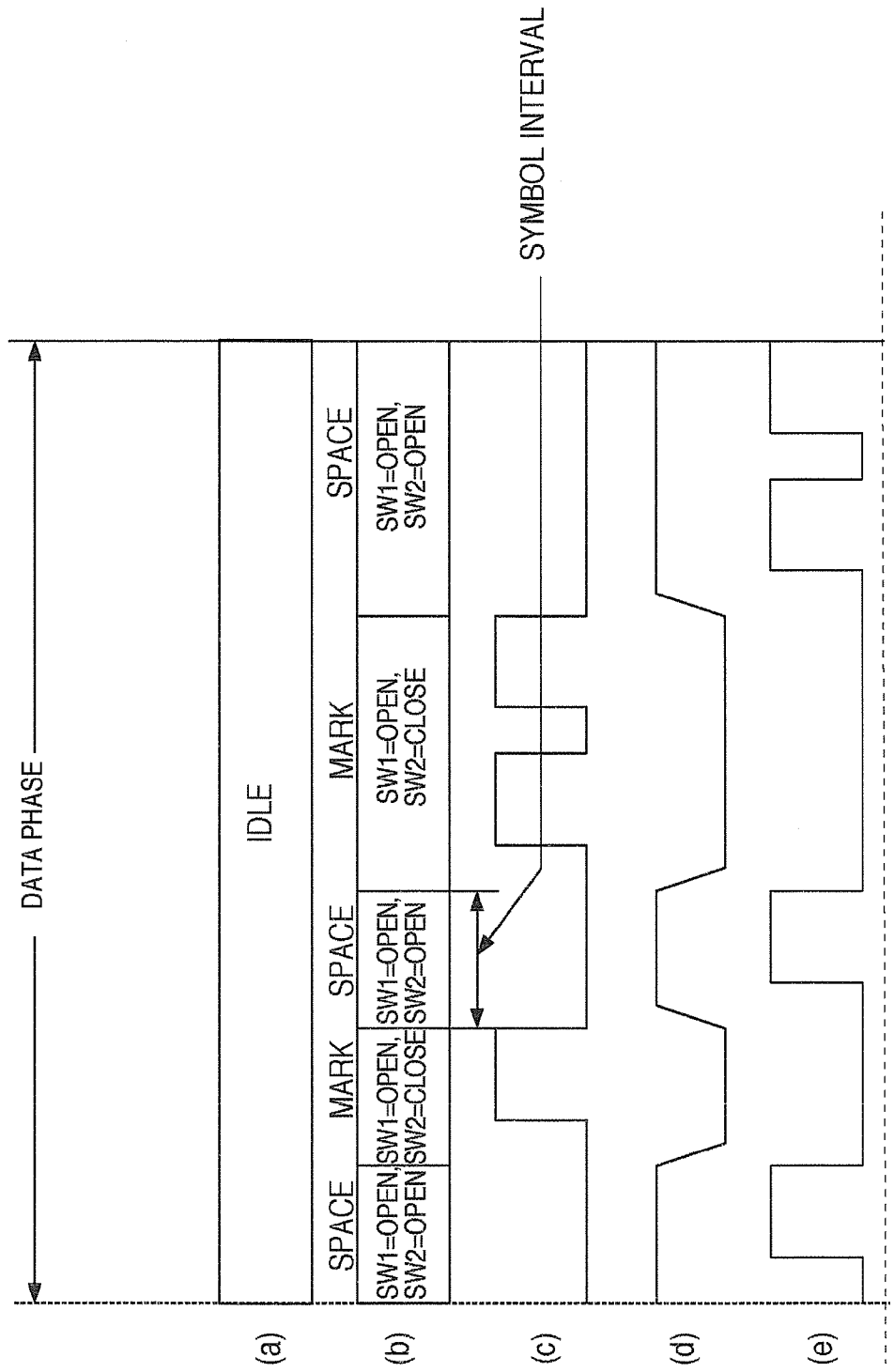
Figure 19D:
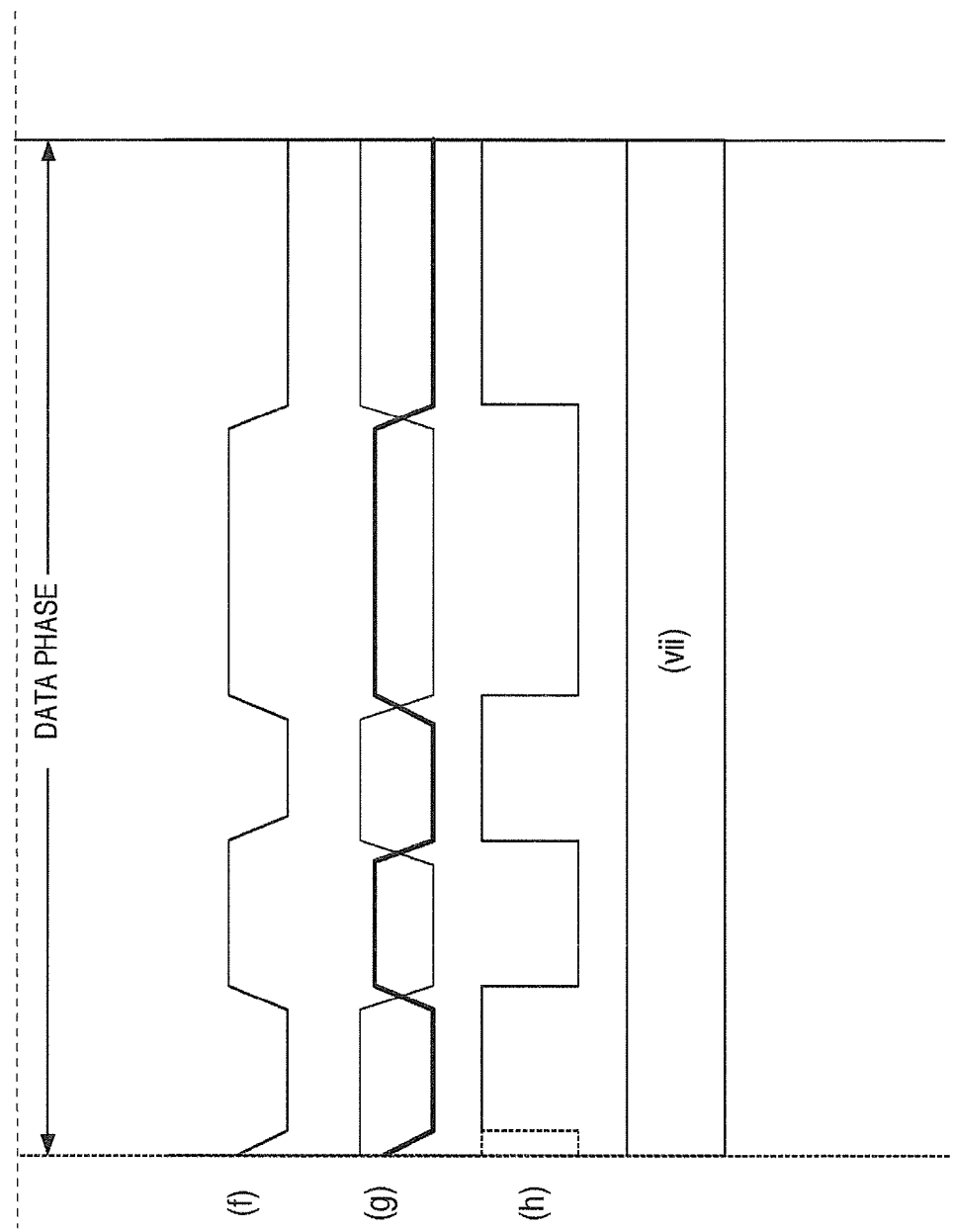

In FIGS. 19C and 19D column (vii), after transmission of N symbols, the master modem and the slave modem enter into the data phase. During the data phase, the slave transmits actual data, and the master modem registers the received symbols as actual data. During the data phase, as explained with reference to FIGS. 19A/19B column (vi), the control logic unit 1818 transitions the PLL 1808*b* into the SYNC mode from the DEMOD mode while the PLL 1808*a* is operated in the DEMOD mode when Mark symbols are received. Similarly, the control logic unit 1818 transitions the PLL 1808*a* into the SYNC mode from the DEMOD mode while the PLL 1808*b* is operated in the DEMOD mode when Space symbols are received.

It is also possible that there may not be any symbol transition over many symbol intervals from a slave modem. For example, a slave modem could continuously transmit Mark symbols for many symbol periods, in which case the PLL 1808*a* may completely go out of track because it has not operated in the SYNC mode for an extended period of time. To avoid this problem, the slave modem can perform bit-stuffing operations before transmitting data during the data phase to ensure sufficient symbol transition density.

Another method for BPSK demodulation at the master modem in FIGS. 10 and 11 is non-coherent DPSK demodulation. This can eliminate the need for a coherent reference signal at the receiver, so a demodulation circuit does not require any PLLs. Moreover, the demodulation can be performed by measuring the relative phase difference between two successive symbols, and the phase difference need not be exactly 180°. The receiver can be equipped with storage capabilities for storing the samples for one symbol period.

Although FIGS. 18 through 19B illustrate one example of a technique for PSK demodulation in a distributed modem architecture, various changes may be made to FIGS. 18 through 19B. For example, while certain circuit arrangements are used to implement specific functions, these functions could be implemented using any other circuit arrangements. Also, the relative lengths and contents of the various rows and columns are for illustration only.

Figure 20:
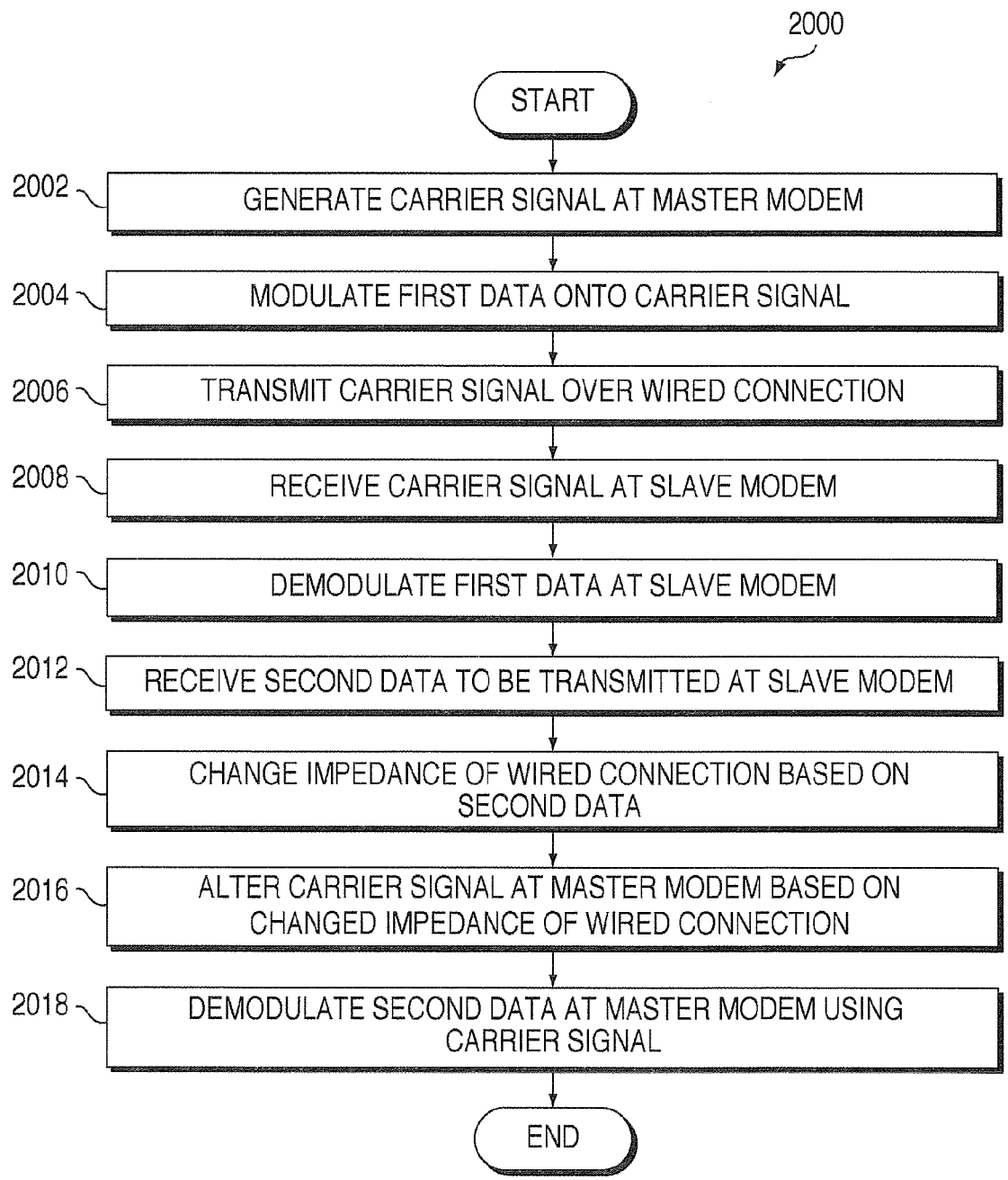
FIG. 20 illustrates an example method for wired communications using a distributed modem architecture according to this disclosure.

FIG. 20 illustrates an example method 2000 for wired communications using a distributed modem architecture according to this disclosure. For ease of explanation, the method 2000 is described with respect to the system 100 of FIG. 1. The same or similar method 2000 could be used by any suitable device(s) and in any suitable system(s).

As shown in FIG. 20, a carrier signal is generated at a master modem at step 2002. This could include, for example, an oscillator in the master modem 108 generating a carrier signal having a frequency with a specified value or within a specified range. First data can be modulated onto the carrier signal at step 2004. This could include, for example, the master modem 108 using FSK, PSK, or other modulation technique to modulate the first data onto the carrier signal.

The carrier signal is transmitted over a wired connection at step 2006, and the carrier signal is received at a slave modem at step 2008. This could include, for example, the master modem 108 transmitting the carrier signal to one or more slave modems 110*a*-110*m* over an AC or DC power line or other wired connection. The first data can be demodulated by the slave modem at step 2010. This could include, for example, the slave modem 110*a*-110*m* using FSK, PSK, or other demodulation technique to demodulate the first data from the carrier signal.

Second data to be transmitted by the slave modem is received at step 2012. This could include, for example, the slave modem 110*a*-110*m* receiving data from one or more passive nodes 104*a*-104*m*. The impedance of the wired connection is changed based on the second data at step 2014. This could include, for example, the slave modem 110*a*-110*m* altering the impedance of a transformer winding or inductor coupled to the wired connection. This could also include the slave modem 110*a*-110*m* altering an inductive reactance coupled to the wired connection.

The changed impedance alters the carrier signal at the master modem at step 2016. This could include, for example, the changed impedance altering a frequency of the carrier signal generated by the oscillator in the master modem 108. However, the carrier signal can be altered in any other suitable manner. This effectively modulates the second data onto the carrier signal, and the change in impedance can be controlled to perform FSK, PSK, or other modulation. The second data on the carrier signal is demodulated at the master modem at step 2018. This could include, for example, the master modem 108 using FSK, PSK, or other demodulation technique to demodulate the second data from the carrier signal.

Although FIG. 20 illustrates one example of a method 2000 for wired communications using a distributed modem architecture, various changes may be made to FIG. 20. For example, the master modem may not transmit data to the slave modems, and steps 2004 and 2010 could be omitted. Also, the second data could be demodulated and used by a component other than the master modem, such as by another slave modem or by a component coupled to the wired connection. In addition, while shown as a series of steps, various steps in FIG. 20 could overlap, occur in parallel, occur in a different order, or occur multiple times.

Various embodiments of distributed modem architectures described above could include any of the following non-limiting features. A specific distributed modem architecture could include any combination of features listed here:

- use of a carrier-based distributed modem concept, where a passive node transmits information on a wire or cable by modulating a carrier that originates at a different location and modulation is effected by varying the impedance of the line used for the carrier;
- use of a separate receiver at an active node to search a band for interference-free segments so that the carrier can be moved away from interference;
- use of more than one active node within a system, such as through frequency and/or time division multiplexing;
- avoidance of harmonics when frequency division multiplexing is used;
- frequency modulation of an active node by one or more passive nodes, such as when the active node's oscillator has a tank circuit formed by the impedance of the line or passive nodes;
- use of common or different modulation techniques by active and passive nodes;
- the short circuiting of the loop-side winding of a transformer by a passive node at a specified data rate to send data (removes the inductance of the winding);
- use of the transformer in a passive node to receive a carrier and convert it to DC to power the passive node, thus eliminating the need to receive power from a PV panel (which may be non-operational due to darkness, shading, or other reasons)
- removal of a keying or shorting switch from the line-side of a transformer at a passive node and keying instead from an equipment-winding by saturating the transformer core;
- use of keying by short-circuiting the equipment-side winding of a transformer at a passive node to reflect a low impedance in the line-side winding of the transformer;
- use of circuitry on the line- or equipment-side winding to present a capacitive reactance to the line instead of zero impedance in order to magnify the overall line impedance change between Mark and Space values;
- use of the signal from the master oscillator in the active node as a pilot signal when the master oscillator is kept on;
- use of a master oscillator embedded with a PLL in an active node to keep the master oscillator on a specific, programmed center frequency, even though part of the tuned circuit is formed by the string loop and passive nodes;
- the addition of a circuit within an active node that creates a capacitive reactance in series with the string loop to cancel or partially cancel its inductive reactance while conducting the direct current harvested from the photovoltaic array;
- use of an inductor instead of a transformer at a passive node;
- use of amplitude shift keying instead of frequency shift keying by a passive node so that an active node can have a conventional oscillator that does not use the string loop as a tuned circuit;
- compensation for passive node tuned circuit component tolerances and drift, where an active node measures the parallel resonance frequency of each passive node by sweeping and discovering its minimum carrier current point and then uses that frequency when addressing the particular passive node (this could be performed each morning when a solar array powers up or at various times, and a protocol can shift the carrier frequency slightly to find a new resonance frequency if acknowledgements are not received);
- compensation for passive node tuned circuit component tolerances and drift, where each passive node adjusts its parallel tuned circuit capacitor value (such as by switching in combinations of parallel capacitor values) for minimum carrier current;
- compensation for passive node tuned circuit component tolerances and drift, where an active node while receiving sweeps over a frequency range just wide enough to accommodate all tolerances for all passive nodes and looks for a dip in carrier current (a dip represents one binary value symbol, while no dip represents the other symbol);
- use of redundant frequency hopping to combat interference;
- reduction of loop inductance by placing all unused nodes in a virtual-zero impedance state (inductors shunted by large-value capacitors);
- the transmission of polling messages at a greatly reduced bit-rate while the passive nodes are equipped with very narrowband matched filters, permitting inactive and virtual zero-impedance state nodes to receive polls with increased reliability;
- use of a series-tuned receiving circuit across a transmitting inductor that presents a near-zero impedance to the line but a high impedance (and therefore high carrier voltage) across either its capacitive or inductive elements, permitting inactive and virtual-zero impedance state nodes to receive polls with increased reliability;
- use of a single master/active node located in a combiner box that can communicate with passive nodes in multiple strings, which can be done when all nodes in the inactive strings are set to the high impedance state and all nodes in the active string (except for the active node) are set to the low impedance state;
- the distribution of inductive reactance cancellation incrementally among the passive nodes in a string, where the virtual-zero impedance state of each node is replaced with a capacitive reactance state whose reactance is sufficient to cancel the inductive reactance of the incremental amount of wire needed (the zero-impedance state of the passive node becomes a small capacitive reactance state, and this finite impedance also facilitates the reception of polling signals while the passive node is inactive);
- use of phase shift keying instead of frequency or amplitude shift keying, which can retain the noise immunity of angle modulation but keep the active node tuned circuit internal to the master modem;
- use of a modem internal architecture suited to phase modulation with uncertain phase deviation;
- use of frequency shift keying by an active node and amplitude or phase shift keying by passive nodes, or various other combinations of modulation; and use of separate up and downlink frequencies to obtain larger phase deviation.

Note that these features are only some of the numerous possible features discussed above. Once again, a specific distributed modem architecture could include any combination of features listed and described in this patent document.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of communicating over a DC power line forming a wiring loop for DC current, the method operable with a distributed modem architecture that includes at least one active node and at least one passive node (collectively, nodes), comprising:

AC coupling each active node and each passive node to the power line wiring loop through respective active and passive node couplers that are tuned to an AC carrier signal, and that enable substantially continuous DC current flow through the power line wiring loop, generating, at the active node, the AC carrier signal with an AC carrier frequency, coupled into the power line wiring loop through the active node coupler;

receiving, at the passive node, the AC carrier signal;

communicating data, from a transmitting passive node to at least one receiving node, at the AC carrier frequency within an AC carrier frequency band by:

changing at a transmitting passive node, the AC impedance of the associated passive node coupler, and thereby changing an AC impedance of the power line wiring loop within the AC carrier frequency band, wherein the AC impedance of the power line wiring loop is changed within the AC carrier frequency band based on data to be transmitted by the transmitting passive node so as to modulate the data onto the AC carrier signal within the AC carrier frequency band;

detecting, at the receiving node, the change in the AC impedance of the power line wiring loop, and thereby detecting the modulated data.

2. The method of claim 1, wherein the passive node coupler comprises one of a transformer winding or an inductor coupled in series with the power line wiring loop.

3. The method of claim 1, wherein changing the AC impedance of the power line wiring loop comprises:

changing a reactance of the passive node coupler.

4. The method of claim 1, further comprising:

converting, at the passive node, the AC carrier signal to DC power for the passive node using a transformer.

5. The method of claim 1, wherein obtaining the data comprises demodulating the data from the AC carrier signal using at least one of: frequency modulation-based demodulation, phase modulation-based demodulation, and amplitude modulation-based demodulation.

6. The method of claim 1, further comprising:

transmitting the AC carrier signal over different power lines at different times; and obtaining data from different passive nodes connected to the power lines, wherein the data is obtained from an individual one of the passive nodes when (i) passive nodes connected to inactive power lines enter a high-impedance state, (ii) passive nodes connected to an active power line enter a low impedance state, and (iii) the individual passive nodes toggles between the high-impedance state and the low-impedance state.

7. The method of claim 1, wherein:

generating the AC carrier signal comprises using an oscillator; and obtaining the data using changes in the AC carrier signal comprises demodulating data in a signal output by the oscillator.

8. The method of claim 1, wherein:

generating the AC carrier signal comprises using an oscillator; and obtaining the data using changes in the AC carrier signal comprises demodulating a signal generated across an inductive structure that receives the AC carrier signal.

9. A system for communicating over a DC power line forming a wiring loop for DC current, operable as a distributed modem architecture, comprising:

at least one active node configured to generate an AC carrier signal with an AC carrier frequency, coupled into the power line wiring loop through the active node coupler;

at least one passive node configured to communicate with the active node over the power line wiring loop, including:

a passive node coupler including an inductive structure coupled to the power line wiring loop, and configured to receive the AC carrier signal over the power line wiring loop; and transmit circuitry configured to change an AC impedance of passive node coupler within an AC carrier frequency band, and thereby change the AC impedance of the power line wiring loop within the AC carrier frequency band, wherein the AC impedance of the power line wiring loop is changed within the AC carrier frequency band based on data to be transmitted by the passive node, so as to modulate the data onto the AC carrier signal within the AC carrier frequency band.

10. The system of claim 9, wherein the inductive structure comprises one of: a transformer winding and an inductor.

11. The system of claim 9, wherein the transmit circuitry comprises a parallel-tuned circuit coupled in parallel with the inductive structure, the parallel-tuned circuit and the inductive structure configured to resonate and change their reactance.

12. The system of claim 9, wherein the transmit circuitry comprises a capacitive or resistive structure coupled in parallel with the inductive structure, the capacitive or resistive structure configured to change the impedance of the inductive structure.

13. The system of claim 9, wherein the active node comprises:
    a carrier signal generator configured to generate the AC carrier signal for transmission over the power line; and
    receive circuitry configured to obtain the data transmitted by the passive node using changes in the AC carrier signal, the changes in the AC carrier signal caused by changes in the AC impedance of the power line wiring loop made by the passive node so as to modulate the data onto the AC carrier signal.

14. The system of claim 13, wherein:
    the carrier signal generator comprises an oscillator; and
    the active node coupler comprises a transformer configured to couple the AC carrier signal to the power line wiring loop.

15. The system of claim 13, wherein the receive circuitry comprises:
    an inductive structure configured to receive the AC carrier signal; and
    a demodulator configured to demodulate a signal generated across the inductive structure.

16. The system of claim 13, wherein:
    the receive circuitry is configured to identify a frequency having less interference than a current frequency of the AC carrier signal and to cause the AC carrier signal generator to change the current frequency of the AC carrier signal.

17. The system of claim 13, wherein the receive circuitry comprises a phase shift keying (PSK) demodulator configured to:
    receive a preamble from the passive node;
    extract symbol timing information using the preamble; and
    obtain the data from the passive node using the symbol timing information;
    wherein the PSK demodulator is configured to obtain the data even when there is unknown and varying phase shifts of symbols from the passive node defining the data.

* * * * *